(12) United States Patent
Baker et al.

(10) Patent No.: US 10,670,261 B2
(45) Date of Patent: Jun. 2, 2020

(54) BURNER PANELS, SUBMERGED COMBUSTION MELTERS, AND METHODS

(71) Applicant: JOHNS MANVILLE, Denver, CO (US)

(72) Inventors: John Wayne Baker, Golden, CO (US); Jonathan McCann, Orchard Park, NY (US); Aaron Morgan Huber, Castle Rock, CO (US); Mark William Charbonneau, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 1106 days.

(21) Appl. No.: 14/838,148

(22) Filed: Aug. 27, 2015

(65) Prior Publication Data
US 2017/0059153 A1 Mar. 2, 2017

(51) Int. Cl.
*F23C 3/00* (2006.01)
*C03B 5/235* (2006.01)
(Continued)

(52) U.S. Cl.
CPC ............ *F23C 3/004* (2013.01); *B23H 1/00* (2013.01); *C03B 5/2356* (2013.01); *F23D 11/12* (2013.01);
(Continued)

(58) Field of Classification Search
CPC ......... F23D 91/04; F23C 3/004; C03B 5/2356
See application file for complete search history.

(56) References Cited

U.S. PATENT DOCUMENTS

| 1,579,353 A | 4/1926 | Good |
| 1,636,151 A | 7/1927 | Schofield |

(Continued)

FOREIGN PATENT DOCUMENTS

| DE | 36 29 986 A1 | 3/1988 |
| DE | 44 24 814 A1 | 1/1996 |

(Continued)

OTHER PUBLICATIONS

"AccuTru Temperature Measurement," AccuTru International Corporation, 2003.
(Continued)

*Primary Examiner* — Avinash A Savani
*Assistant Examiner* — Deepak A Deean
(74) *Attorney, Agent, or Firm* — Robert D. Touslee

(57) ABSTRACT

Combustion burner panels, submerged combustion melters including one or more of the panels, and methods of making the same are disclosed. In certain embodiments, the burner panel includes a panel body having first and second major surfaces, at least one oxidant through-passage extending from the first to the second major surface, and at least one fuel through-passage extending from the first to the second major surface. Oxidant and fuel delivery conduits are positioned in the respective passages. The oxidant and fuel delivery conduits include proximal and distal ends, at least some of the distal ends positioned away from the first major surface of the panel body. In other embodiments the burner panels include a frame enclosing a porous material having through passages for fuel and oxidant. The burner panels may enable delaying combustion in a submerged combustion melter, and therefore promote burner life and melter campaign length.

13 Claims, 11 Drawing Sheets

(51) Int. Cl.
  *B23H 1/00* (2006.01)
  *F23D 11/12* (2006.01)
  *F23D 11/36* (2006.01)
  *F23D 14/22* (2006.01)
  *F23D 14/78* (2006.01)

(52) U.S. Cl.
  CPC .............. *F23D 11/36* (2013.01); *F23D 14/22* (2013.01); *F23D 14/78* (2013.01); *C03B 2211/23* (2013.01); *Y02P 40/55* (2015.11)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat |
| 3,239,325 A | 3/1966 | Roberson et al. |
| 3,241,548 A | 3/1966 | See et al. |
| 3,245,769 A | 4/1966 | Eck et al. |
| 3,248,205 A * | 4/1966 | Marceau .............. C03B 5/2356 65/121 |
| 3,248,206 A | 4/1966 | Apple et al. |
| 3,260,587 A * | 7/1966 | Marceau .............. C03B 5/2356 122/6 R |
| 3,268,313 A | 8/1966 | Burgman et al. |
| 3,285,834 A | 11/1966 | Guerrieri et al. |
| 3,294,512 A | 12/1966 | Penberthy |
| 3,325,928 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Womer |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A * | 10/1973 | Brocious .............. C03B 5/04 65/135.8 |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A * | 9/1985 | Hanneken ............. C03B 3/02 65/134.4 |
| 4,542,106 A | 9/1985 | Sproull |

(56) References Cited

U.S. PATENT DOCUMENTS

| | | |
|---|---|---|
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,671,765 A | 6/1987 | Tsai |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbauch et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Philippe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |

(56) References Cited

U.S. PATENT DOCUMENTS

| | | | |
|---|---|---|---|
| 7,273,583 B2 * | 9/2007 | Rue | C03B 5/2356 266/242 |
| 7,330,634 B2 | 2/2008 | Aitken et al. | |
| 7,383,698 B2 | 6/2008 | Ichinose et al. | |
| 7,392,668 B2 | 7/2008 | Adams et al. | |
| 7,428,827 B2 | 9/2008 | Maugendre et al. | |
| 7,441,686 B2 | 10/2008 | Odajima et al. | |
| 7,448,231 B2 | 11/2008 | Jeanvoine et al. | |
| 7,454,925 B2 | 11/2008 | DeAngelis et al. | |
| 7,509,819 B2 | 3/2009 | Baker et al. | |
| 7,565,819 B2 | 7/2009 | Jeanvoine et al. | |
| 7,578,988 B2 | 8/2009 | Jacques et al. | |
| 7,581,948 B2 | 9/2009 | Borders et al. | |
| 7,622,677 B2 | 11/2009 | Barberree et al. | |
| 7,624,595 B2 | 12/2009 | Jeanvoine et al. | |
| 7,748,592 B2 | 7/2010 | Koga et al. | |
| 7,767,606 B2 | 8/2010 | McGinnis et al. | |
| 7,778,290 B2 | 8/2010 | Sacks et al. | |
| 7,781,562 B2 | 8/2010 | Crawford et al. | |
| 7,802,452 B2 | 9/2010 | Borders et al. | |
| 7,832,365 B2 | 11/2010 | Hannum et al. | |
| 7,845,314 B2 | 12/2010 | Smith | |
| 7,855,267 B2 | 12/2010 | Crawford et al. | |
| 7,946,136 B2 | 5/2011 | Watkinson | |
| 8,033,254 B2 | 10/2011 | Hannum et al. | |
| 8,279,899 B2 | 10/2012 | Kitabayashi | |
| 8,285,411 B2 | 10/2012 | Hull et al. | |
| 8,402,787 B2 | 3/2013 | Pernode et al. | |
| 8,424,342 B2 | 4/2013 | Kiefer et al. | |
| 8,487,262 B2 | 7/2013 | Damm et al. | |
| 8,650,914 B2 | 2/2014 | Charbonneau | |
| 8,707,739 B2 | 4/2014 | Huber et al. | |
| 8,707,740 B2 | 4/2014 | Huber et al. | |
| 8,769,992 B2 | 7/2014 | Huber | |
| 8,875,544 B2 | 11/2014 | Charbonneau | |
| 8,973,400 B2 | 3/2015 | Charbonneau et al. | |
| 8,973,405 B2 | 3/2015 | Charbonneau et al. | |
| 8,991,215 B2 | 3/2015 | Shock et al. | |
| 8,997,525 B2 | 4/2015 | Shock et al. | |
| 9,021,838 B2 | 5/2015 | Charbonneau et al. | |
| 9,032,760 B2 | 5/2015 | Charbonneau et al. | |
| 9,096,452 B2 | 8/2015 | Charbonneau et al. | |
| 9,096,453 B2 | 8/2015 | Charbonneau | |
| 2001/0039813 A1 | 11/2001 | Simpson et al. | |
| 2002/0086077 A1 | 7/2002 | Noller et al. | |
| 2002/0124598 A1 | 9/2002 | Borysowicz et al. | |
| 2002/0134112 A1 | 9/2002 | Barrow et al. | |
| 2002/0152770 A1 | 10/2002 | Becher et al. | |
| 2002/0162358 A1 | 11/2002 | Jeanvoine et al. | |
| 2002/0166343 A1 | 11/2002 | LeBlanc | |
| 2003/0000250 A1 | 1/2003 | Arechaga et al. | |
| 2003/0015000 A1 | 1/2003 | Hayes et al. | |
| 2003/0029197 A1 | 2/2003 | Jeanvoine et al. | |
| 2003/0037571 A1 | 2/2003 | Kobayashi et al. | |
| 2004/0025569 A1 | 2/2004 | Damm et al. | |
| 2004/0099009 A1 | 5/2004 | Linz et al. | |
| 2004/0128098 A1 | 7/2004 | Neuhaus et al. | |
| 2004/0131988 A1 | 7/2004 | Baker et al. | |
| 2004/0168474 A1 | 9/2004 | Jeanvoine et al. | |
| 2004/0224833 A1 | 11/2004 | Jeanvoine et al. | |
| 2005/0039491 A1 | 2/2005 | Maugendre et al. | |
| 2005/0061030 A1 | 3/2005 | Ichinose et al. | |
| 2005/0083989 A1 | 4/2005 | Leister et al. | |
| 2005/0103323 A1 | 5/2005 | Engdal | |
| 2005/0236747 A1 * | 10/2005 | Rue | C03B 5/2356 266/217 |
| 2006/0000239 A1 | 1/2006 | Jeanvoine et al. | |
| 2006/0101859 A1 | 5/2006 | Takagi et al. | |
| 2006/0122450 A1 | 6/2006 | Kim et al. | |
| 2006/0144089 A1 | 7/2006 | Eichholz et al. | |
| 2006/0162387 A1 | 7/2006 | Schmitt et al. | |
| 2006/0174655 A1 | 8/2006 | Kobayashi et al. | |
| 2006/0177785 A1 | 8/2006 | Varagani et al. | |
| 2006/0233512 A1 | 10/2006 | Aitken et al. | |
| 2006/0257097 A1 | 11/2006 | Aitken et al. | |
| 2006/0287482 A1 | 12/2006 | Crawford et al. | |
| 2006/0293494 A1 | 12/2006 | Crawford et al. | |
| 2006/0293495 A1 | 12/2006 | Crawford et al. | |
| 2007/0051136 A1 | 3/2007 | Watkinson | |
| 2007/0106054 A1 | 5/2007 | Crawford et al. | |
| 2007/0122332 A1 | 5/2007 | Jacques et al. | |
| 2007/0130994 A1 | 6/2007 | Boratav et al. | |
| 2007/0137259 A1 | 6/2007 | Borders et al. | |
| 2007/0212546 A1 | 9/2007 | Jeanvoine et al. | |
| 2007/0220922 A1 | 9/2007 | Bauer et al. | |
| 2007/0266737 A1 | 11/2007 | Rodek et al. | |
| 2007/0278404 A1 | 12/2007 | Spanke et al. | |
| 2008/0035078 A1 | 2/2008 | Li | |
| 2008/0227615 A1 | 9/2008 | McGinnis et al. | |
| 2008/0256981 A1 | 10/2008 | Jacques et al. | |
| 2008/0276652 A1 | 11/2008 | Bauer et al. | |
| 2008/0278404 A1 | 11/2008 | Blalock et al. | |
| 2008/0293857 A1 | 11/2008 | Crawford et al. | |
| 2008/0302136 A1 | 12/2008 | Bauer et al. | |
| 2009/0042709 A1 | 2/2009 | Jeanvoine et al. | |
| 2009/0044568 A1 | 2/2009 | Lewis | |
| 2009/0120133 A1 | 5/2009 | Fraley et al. | |
| 2009/0176639 A1 | 7/2009 | Jacques et al. | |
| 2009/0220899 A1 | 9/2009 | Spangelo et al. | |
| 2009/0235695 A1 * | 9/2009 | Pierrot | C03B 5/20 65/356 |
| 2009/0320525 A1 | 12/2009 | Johnson | |
| 2010/0064732 A1 | 3/2010 | Jeanvoine et al. | |
| 2010/0087574 A1 | 4/2010 | Crawford et al. | |
| 2010/0089066 A1 | 4/2010 | Mina | |
| 2010/0089383 A1 | 4/2010 | Cowles | |
| 2010/0120979 A1 | 5/2010 | Crawford et al. | |
| 2010/0139325 A1 | 6/2010 | Watkinson | |
| 2010/0143601 A1 | 6/2010 | Hawtof et al. | |
| 2010/0162757 A1 | 7/2010 | Brodie | |
| 2010/0227971 A1 | 9/2010 | Crawford et al. | |
| 2010/0236323 A1 | 9/2010 | D'Angelico et al. | |
| 2010/0242543 A1 | 9/2010 | Ritter et al. | |
| 2010/0300153 A1 | 12/2010 | Zhang et al. | |
| 2010/0304314 A1 | 12/2010 | Rouchy et al. | |
| 2010/0307196 A1 | 12/2010 | Richardson | |
| 2010/0313604 A1 | 12/2010 | Watson et al. | |
| 2010/0319404 A1 | 12/2010 | Borders et al. | |
| 2010/0326137 A1 | 12/2010 | Rouchy et al. | |
| 2011/0048125 A1 | 3/2011 | Jackson et al. | |
| 2011/0054091 A1 | 3/2011 | Crawford et al. | |
| 2011/0061642 A1 | 3/2011 | Rouchy et al. | |
| 2011/0088432 A1 | 4/2011 | Purnode et al. | |
| 2011/0107670 A1 | 5/2011 | Galley et al. | |
| 2011/0236846 A1 * | 9/2011 | Rue | F27B 3/205 432/195 |
| 2011/0308280 A1 * | 12/2011 | Huber | C03B 5/04 65/126 |
| 2012/0033792 A1 | 2/2012 | Kulik et al. | |
| 2012/0077135 A1 | 3/2012 | Charbonneau | |
| 2012/0216567 A1 | 8/2012 | Boughton et al. | |
| 2012/0216568 A1 | 8/2012 | Fisher et al. | |
| 2012/0216576 A1 | 8/2012 | Boughton et al. | |
| 2013/0072371 A1 | 3/2013 | Jansen et al. | |
| 2013/0086944 A1 | 4/2013 | Shock et al. | |
| 2013/0086949 A1 * | 4/2013 | Charbonneau | F23D 14/64 65/134.4 |
| 2013/0086950 A1 | 4/2013 | Huber et al. | |
| 2013/0086951 A1 | 4/2013 | Charbonneau et al. | |
| 2013/0086952 A1 | 4/2013 | Charbonneau et al. | |
| 2013/0123990 A1 | 5/2013 | Kulik et al. | |
| 2013/0279532 A1 | 10/2013 | Ohmstede et al. | |
| 2013/0283861 A1 | 10/2013 | Mobley et al. | |
| 2013/0327092 A1 | 12/2013 | Charbonneau | |
| 2014/0090422 A1 | 4/2014 | Charbonneau et al. | |
| 2014/0090423 A1 | 4/2014 | Charbonneau et al. | |
| 2014/0144185 A1 | 5/2014 | Shock et al. | |
| 2016/0107914 A1 * | 4/2016 | Baker | C03B 5/2353 432/13 |
| 2016/0130168 A1 * | 5/2016 | Cowles | C03B 5/2356 65/346 |

(56) References Cited

U.S. PATENT DOCUMENTS

FOREIGN PATENT DOCUMENTS

| | | |
|---|---|---|
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| EP | 2 397 446 A2 | 12/2011 |
| EP | 2 433 911 A1 | 3/2012 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 1449439 | 9/1976 |
| IT | 1208172 | 7/1989 |
| JP | S58 199728 A | 11/1983 |
| KR | 2000 0050572 A | 8/2000 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |

OTHER PUBLICATIONS

"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, dated Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
"Gamma Irradiators for Radiation Processing" Booklet, International Atomic Energy Agency, Vienna, Austria.
Furman, BJ, ME 120 Experimental Methods Vibration Measurement, San Jose University Department of Mechanical and Aerospace Engineering.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al, "Submerged Combustion Melting of Glass," International Journal of Applied Glass Science, Nov. 9, 2011, pp. 262-274, vol. 2, No. 4.
National Laboratory, US DOE contract No. DE-AC09-08SR22470, Oct. 2011.

\* cited by examiner

```
                                                            ╱─750
                                                           ╱

┌─────────────────────────────────────────────────────────────┐
│ A method of fabricating a burner panel, the method comprising│
│    (a) forming components, in no particular order:           │
│       (i)   the planar cap and external wall as a single component;│
│       (ii)  a tube table comprising the fluid conduits, the oxidant│──752
│             conduits, and a first horizontal wall, with two vertical│
│             walls positioned about the horizontal wall, wherein│
│             the fuel and oxidant conduits are of different lengths;│
│       (iii) a second horizontal wall having through-passages for│
│             oxidant and fuel conduits, and a third vertical wall; and│
│       (iv)  a third horizontal wall having a single vertical wall│
│             pendant therefrom.                               │
└─────────────────────────────────────────────────────────────┘
                              │
                              ▼
┌─────────────────────────────────────────────────────────────┐
│ Fitting components (i)-(iv) together to form a burner sub-assembly.│──754
└─────────────────────────────────────────────────────────────┘
                              │
                              ▼
┌─────────────────────────────────────────────────────────────┐
│            Fitting coolant supply and return conduits        │──756
│                    to the burner sub-assembly.               │
└─────────────────────────────────────────────────────────────┘
                              │
                              ▼
┌─────────────────────────────────────────────────────────────┐
│          Fitting fuel and oxidant supply conduits to the burner│──758
│              sub-assembly, thus forming a burner body.       │
└─────────────────────────────────────────────────────────────┘
                              │
                              ▼
┌─────────────────────────────────────────────────────────────┐
│          Fitting or attaching the burner body to the panel body.│──760
└─────────────────────────────────────────────────────────────┘
```

FIG. 7

BURNER PANELS, SUBMERGED COMBUSTION MELTERS, AND METHODS

BACKGROUND INFORMATION

Technical Field

The present disclosure relates generally to the field of combustion burners and methods of use, and more specifically to burners, submerged combustion melters, and methods of their use, particularly for melting glass-forming materials, mineral wool forming materials, and other non-metallic inorganic materials.

Background Art

A submerged combustion melter (SCM) may be employed to melt glass batch and/or waste glass materials to produce molten glass, or may melt mineral wool feedstock to make mineral or rock wool, by passing oxygen, oxygen-enriched mixtures, or air along with a liquid, gaseous and/or particulate fuel (some of which may be in the glass-forming materials), directly into a molten pool of glass or other material, usually through burners submerged in a melt pool. The introduction of high flow rates of products of combustion of the oxidant and fuel into the molten material, and the expansion of the gases during submerged combustion (SC), cause rapid melting of the glass batch or other feedstock and much turbulence and foaming.

In the context of SCMs, SC burners are predominately water-cooled, nozzle mix designs and may avoid premixing of oxidant and fuel for safety reasons due to the increased reactivity of using oxygen as the oxidant versus air. Nevertheless, one currently used submerged combustion burner employs a smooth exterior surface, half-toroid metallic burner tip of the same or similar material as the remainder of the burner, where the fuel and oxidant begin mixing just after escaping the burner tip. When using such burners in an SCM for the manufacture of glass, the burner tip is placed in an extreme environment. The burner tip is exposed to corrosive combustion gases, high temperature glass contact, internal pressure from water or other coolant, vaporization of coolant within the burner tip, thermal cycling, and the like. As a result, it has been determined that thermal fatigue resistance, high melting point, high temperature corrosion/oxidation resistance, high temperature structural strength, and ability to join/fabricate are some of the key requirements for designing next generation SC burners.

Due to these requirements, noble metal alloys have become the focus. However, being expensive alloys, it is not presently economical to fabricate the entire burner using these materials. Because of this, up until now the burner designer was left with the challenge of determining how to best attach the non-noble metal portion of the burner to the noble metal tip without sacrificing other concerns, such as good mechanical strength, coolant leak proofing, and noble metal recovery. It would be an advance in the submerged combustion burner art if new burner designs were able to avoid some or all of these issues, and prolong the run-length or campaign length of the submerged combustion melter.

SUMMARY

In accordance with the present disclosure, submerged combustion (SC) burner panels are described that may reduce or eliminate problems with known SC burners, melters, and methods of using the melters to produce molten glass and other non-metallic inorganic materials, such as rock wool and mineral wool.

A combustion burner panel comprising:
(a) a panel body having first and second major surfaces;
(b) at least one oxidant through-passage in the panel body extending from the first to the second major surface;
(c) at least one fuel through-passage in the panel body extending from the first to the second major surface;
(d) at least one oxidant delivery conduit positioned in the at least one oxidant through-passage;
(e) at least one fuel delivery conduit positioned in the at least one fuel through-passage;
wherein each of the oxidant delivery conduits and fuel deliver conduits comprise proximal and distal ends, at least some of the distal ends positioned away from the first major surface of the panel body.

Other burner panels, and submerged combustion melters (SCM) comprising at least one burner panel of this disclosure, and methods of producing molten non-metallic inorganic materials such as molten glass, in the SCMs, are considered aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burner panels, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIG. 7 is a schematic logic diagram of a method of melting non-metallic inorganic materials in accordance with the present disclosure;

Figure 1A:
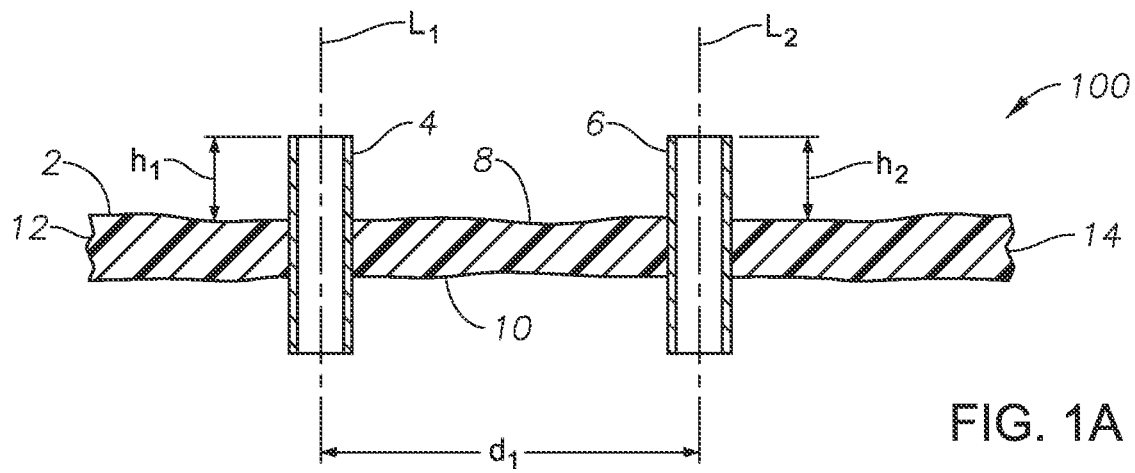
FIGS. 1A-1F are schematic cross-sectional views of six burner panels in accordance with the present disclosure.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed SC burner panels, SC burners, SCMs, and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments where "consisting essentially of" and "consisting of" are explicitly disclosed herein and are part of this disclosure. All published patent applications and patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass, the burner tip is placed in an extreme environment. One problem is that the tip of the burner is exposed to the extreme high temperatures of an oxy-gas flame when oxygen-enriched oxidants are used. Such flames, when deflected, can melt the burner tip. Using noble metals and alloys for burner tips presents the additional challenge of attaching the burner tip to the base metal of the remainder of the burner. The present application is devoted to resolving this challenge with a new approach to burner design for submerged combustion.

Various terms are used throughout this disclosure. "Submerged" as used herein means that combustion gases emanate from combustion burners or combustion burner panels under the level of the molten glass; the burners may be floor-mounted, wall-mounted, or in melter embodiments comprising more than one submerged combustion burner, any combination thereof (for example, two floor mounted burners and one wall mounted burner). Burner panels described herein may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner emits oxidant, and vice versa). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Burner panels of the present disclosure aim to solve the problem of short life of SC burners. In certain embodiments this is accomplished by employing separate injection of oxidant and fuel into the material being melted, or molten material, so that the combustion reaction occurs further away from the tip of the burner, thus reducing the exposure of the burner tip to extreme high temperatures ad well as reducing the severity of thermal cycling. There are several embodiments in which this concept could be implemented within the SCM to achieve the final goal of moving combustion away from the tip of the burner. The current design is a design where the fuel is injected with the oxidant such that the fuel is surrounded by oxidant and they immediately begin mixing. By injecting oxidant and fuel separately, the intent of this disclosure is to inject the fuel and oxidant separately to delay mixing and the associated combustion until both fuel and oxidant are further from the burner tip. FIGS. 1A-1F illustrates schematically several embodiments of the concept, which we sometimes denote as "distributed" combustion.

FIG. 1A illustrates schematically embodiment 100, where fuel and oxidant conduits, 4 and 6 respectively, are separated by a distance $d_1$ in a ceramic, or refractory, or refractory-coated metal panel body 2 having first and second major surfaces 8, 10, and first and second edges 12, 14. Major surfaces 8, 10 are purposefully illustrated in FIG. 1A as somewhat uneven, indicating their refractory composition. In certain embodiments, major surfaces 8, 10 may be relatively smooth or flat. Furthermore, edges 12, 14 are illustrated unevenly. The shape of edges is desirably such that they will "fit" with an adjoining burner panel. Panel body 2 may be comprised of refractory-coated rebar or other strong, durable support structure. Distance $d_1$, measured typically, but not necessarily between longitudinal axis $L_1$ and $L_2$ of fuel and oxidant conduits 4, 6, may range from about the range of at least 0 cm or greater (as illustrated in embodiment 400, FIG. 1D); for example, the distance $d_1$ may have a distance in the range of at least 1 cm or greater; or in the alternative, the distance $d_1$ may have a distance in the range of at least 5 cm or greater; or in the alternative, the distance $d_1$ may have a distance in the range of at least 15 cm or greater; or in the alternative, the distance $d_1$ may have a distance in the range of at least 25 cm or greater; or in the alternative, the distance $d_1$ may have a distance in the range of at least 30 cm or greater. The magnitude of distance $d_1$ is limited only by the length of the body panel $l_1$ (as illustrated in FIG. 2B).

Referring again to FIG. 1A, fuel and oxidant conduits 4, 6, may extend above first major surface 8 by heights $h_1$ and $h_2$ respectively, which may be the same or different. Referring to embodiment 300 illustrated in FIG. 1C, fuel conduit 4 includes a distal end 28 and a proximal end 30, while oxidant conduit 6 includes a distal end 32 and a proximal end 34. Heights $h_1$ and $h_2$ of distal ends 28 and 32 may each range from about 0 (in other words, flush with major surface 8 or body panel 2), or in the alternative, the heights $h_1$ and $h_2$ may have a magnitude in the range of at least 5 cm or greater; or in the alternative, the heights $h_1$ and $h_2$ may have a magnitude in the range of at least 15 cm or greater; or in the alternative, the heights $h_1$ and $h_2$ may have a magnitude in the range of at least 25 cm or greater; or in the alternative, the heights $h_1$ and $h_2$ may have a magnitude in the range of at least 30 cm or greater. Theoretically the magnitude of heights $h_1$ and $h_2$ are limited only by the height of the SCM roof above the burner panel, but practically speaking, in order to conserve refractory and produce optimum heating, the heights $h_1$ and $h_2$ would not extend above the level of molten material in the SCM.

Figure 1B:
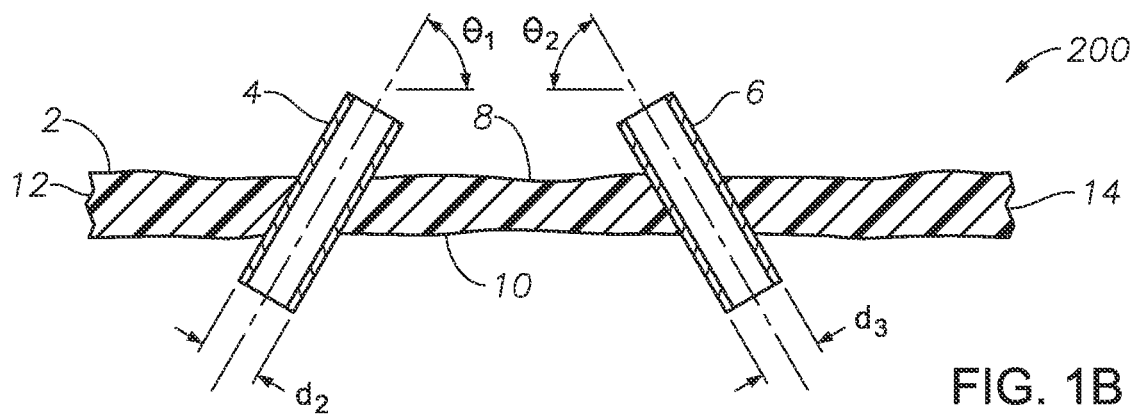

FIG. 1B illustrates schematically embodiment 200, where fuel conduit 4 and oxidant conduit 6 are angled toward each other at angles $\theta_1$ and $\theta_2$, which may be the same or different, and each may independently range from about 20 to about 90 degrees. All individual values and subranges from about 20 to about 90 degrees are included herein and disclosed herein. For example, the angles used can be from a lower limit of about 20, 21, 23, 25, 27, 29, 31, 33, 35, or 40 to an upper limit of 50, 52, 54, 56, 58, 60, 75, 80, 85, or about 90 degrees. For example, the angles $\theta_1$ and $\theta_2$ may be in the range of from about 30 to about 80 degrees, or in the alternative, the angles $\theta_1$ and $\theta_2$ may be in the range of from about 40 to about 70 degrees, or in the alternative, the angles $\theta_1$ and $\theta_2$ may be in the range of from about 40 to about 50 degrees.

FIG. 1B also illustrates diameters $d_2$ and $d_3$ of fuel and oxidant conduits, respectively. Fuel and oxidant conduits 4 and 6 may be round or other cross-sectional shape conduits, and diameters $d_2$ and $d_3$ may each independently range form about 1 cm up to about 20 cm or larger. All individual values and subranges from about 1 to about 20 cm are included herein and disclosed herein. For example, diameters $d_2$ and $d_3$ may range from a lower limit of about 1, 2, 3, 5, 7, 9, 11, 13, 15, or 17 to an upper limit of 10, 11, 12, 13, 14, 15, 16, 17, 18, or about 20 cm. For example, the diameters $d_2$ and $d_3$ may be in the range of from about 10 to about 20 cm, or in the alternative, the diameters $d_2$ and $d_3$ may be in the range of from about 10 to about 17 cm, or in the alternative, the diameters $d_2$ and $d_3$ may be in the range of from about 10 to about 15 cm.

Figure 1C:
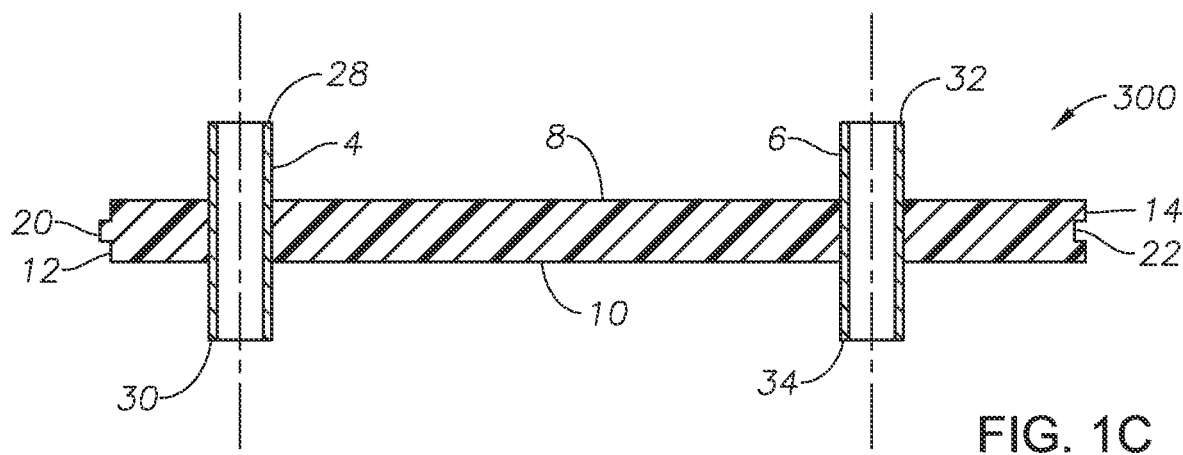
Figure 1D:
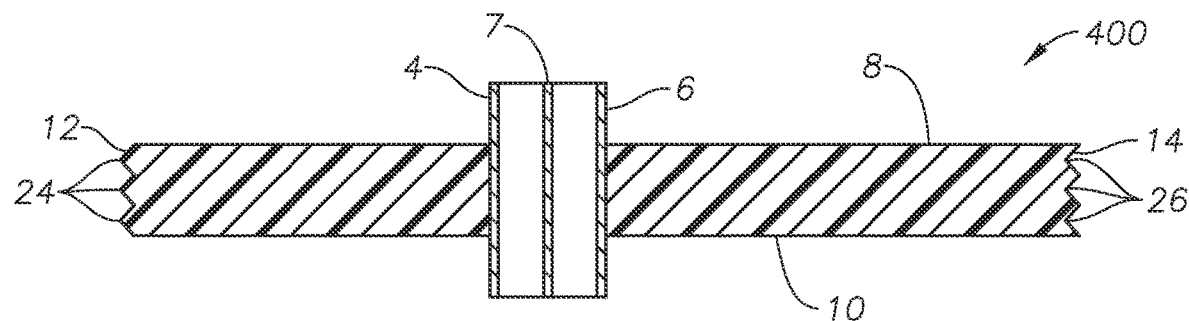

FIGS. 1C and 1D illustrate schematically embodiments 300 and 400, where fuel and oxidant conduits are separated in embodiment 300 by a large distance $d_1$, for example several feet, or alternatively wherein fuel and oxidant conduits are adjacent in embodiment 400; in certain embodiments fuel and oxidant conduits may be attached or formed together. Embodiment 300 and 400 also illustrate two possible edge-joining shapes, with embodiment 300 of FIG. 1C illustrating edge 12 having a male portion 20 configured to fit into a female-shaped portion 22 of edge 14 of another panel body. Embodiment 400 of FIG. 1D illustrates saw tooth patterns 24, 26, on edges 12, 14, respectively. Embodiment 400 also illustrates a common or adjacent portion 7, formed when fuel and oxidant conduits 4, 6 are formed together. In embodiment 400, the distance $d_1=0$.

Figure 1E:
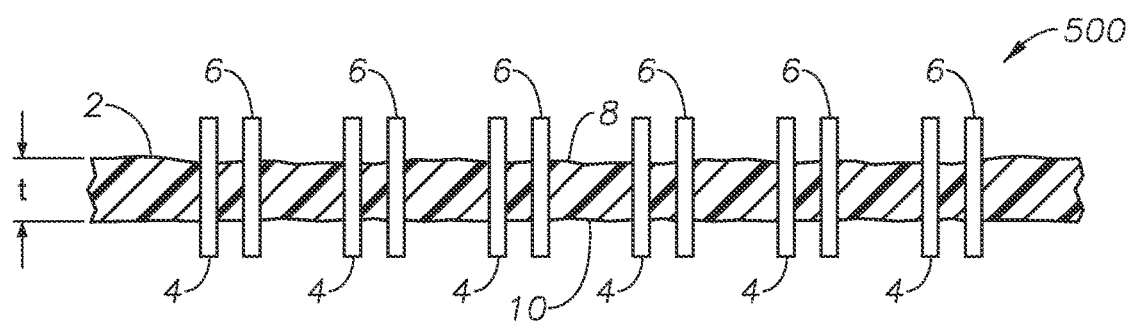
Figure 1F:
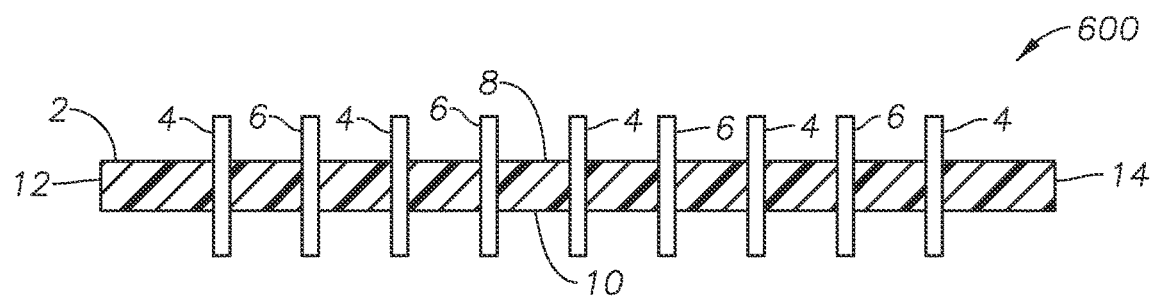

FIG. 1E illustrates schematically embodiment 500, wherein the volume of fuel and/or oxidant flowing through one or more fuel and/or oxidant conduits could be decreased, necessitating more insertion points though paired fuel and oxidant conduits. FIG. 1F illustrates schematically embodiment 600, wherein fuel and oxidant conduits are equally spaced through out the burner body panel, and thus throughout the SCM if these panels were installed in an SCM floor. Edges 12 and 14 are illustrated as squared edges, and major surfaces 8 and 10 are illustrated as substantially flat in embodiment 600.

Burner body panel 2 may have a thickness "t", as indicated in FIG. 1E, in the range of at least 0.5 cm or greater; for example, the body panel may have a thickness in the range of at least 1 cm or greater; or in the alternative, the body panel may have a thickness in the range of at least 5 cm or greater; or in the alternative, the body panel may have a thickness in the range of at least 15 cm or greater; or in the alternative, the body panel may have a thickness in the range of at least 25 cm or greater; or in the alternative, the body panel may have a thickness in the range of at least 30 cm or greater. The body panel may comprise a single layer; or in the alternative, the body panel may comprise two or more layers or sub-panels.

Figure 2A:
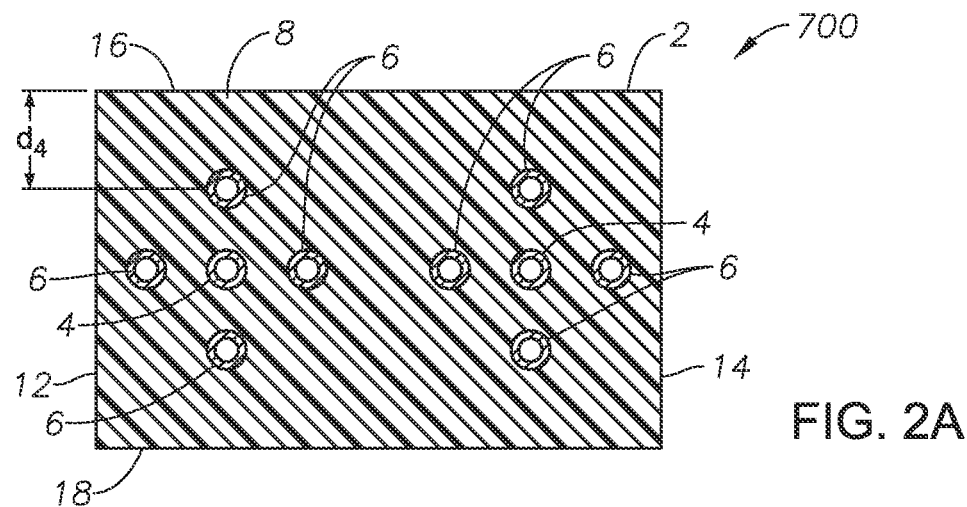
FIGS. 2A-2E, 4A-4B, and 5A-5D are schematic plan views of eleven burner panels in accordance with the present disclosure.
Figure 2B:
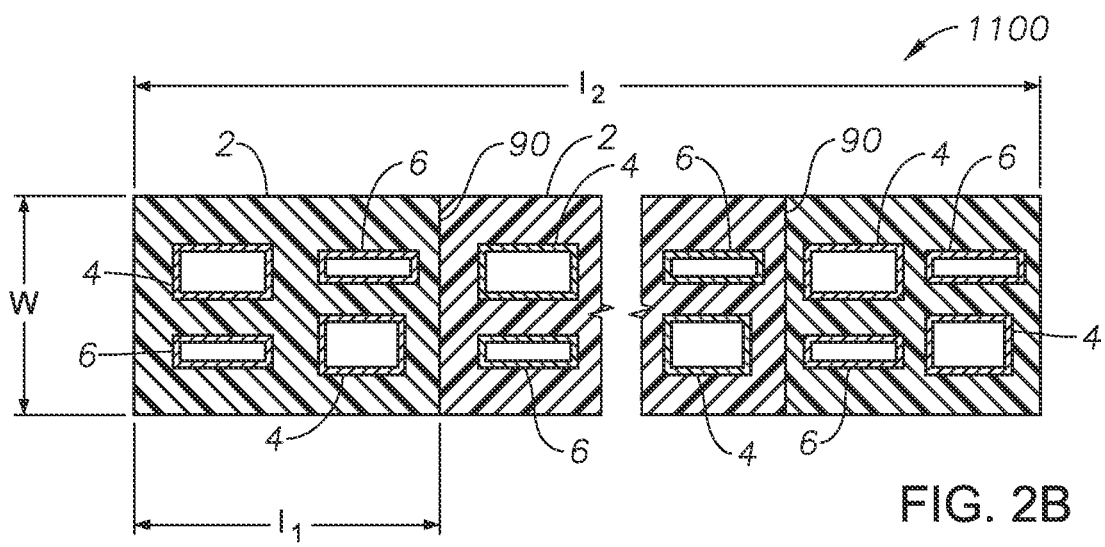

FIGS. 2A-2E illustrate schematically, in plan view, a number of SCM burner panel embodiments in accordance with the present disclosure. Embodiment 700 illustrated schematically in FIG. 2A is an embodiment wherein the ratio of oxidant and fuel insertion conduits may vary from 1:1; in embodiment 700 the ratio of O:F conduits is 4:1. All individual values and subranges from about 1:10 to about 10:1 are included herein and disclosed herein. For example, the ratio of oxidant to fuel conduits may range from a lower limit of about 1:10, 2:10, 3:10, 5:10, 7:10, to 9:10 or 1:1 to an upper limit of 10:5, 10:4, 10:3, 10:2, or about 10:1. For example, the ratio of oxidant to fuel conduits may be in the range of from about 2:10 to about 10:5, or in the alternative, the ratio of oxidant to fuel conduits may be in the range of from about 3:10 to about 10:4, or in the alternative, the ratio of oxidant to fuel conduits may be in the range of from about 1:1 to about 10:5. FIG. 2A also illustrates edges 16, 18, as well as distance $d_4$, illustrating the distance of oxidant conduit 6 from edge 16. Distance $d_4$ may range from about the range of at least 5 cm or greater; for example, the distance $d_4$ may have a magnitude in the range of at least 10 cm or greater; or in the alternative, the distance $d_4$ may have a magnitude in the range of at least 12 cm or greater; or in the alternative, the distance $d_4$ may have a magnitude in the range of at least 15 cm or greater; or in the alternative, the distance $d_4$ may have a magnitude in the range of at least 20 cm or greater. The magnitude of distance $d_4$ is limited only by the width of the body panel W (as illustrated in FIG. 2B).

Figures 2C, 2D, 2E:
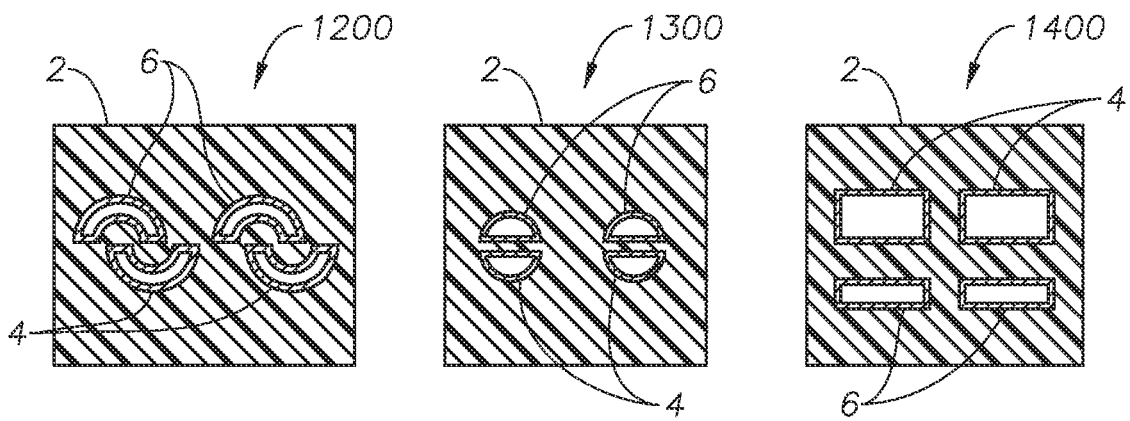

FIG. 2B illustrates schematically another burner panel embodiment 1100, wherein a series of burner panels 2, each of length $l_1$ may be pieced together to form a portion of or the entire SCM floor having a length $l_2$, and the pattern of fuel and oxidant conduits 4, 6 extended or changed from one panel 2 to the next. Indeed, the lengths of panels 2 may or may not be the same length $l_1$ or width W. In embodiment 1100 the fuel and oxidant conduits 4, 6 are rectangular, with alternating fuel and oxidant conduits along the length of the panel body 2. FIGS. 2C, 2D, and 2E illustrate schematically three other burner panel embodiments 1200, 1300, and 1400, of the present disclosure. Fuel and oxidant slots 4, 6 may be linear or nonlinear, co-aligned or purposely misaligned, or in an alternating pattern, each combination optimized for component life and for energy effectiveness. Each embodiment illustrated in FIGS. 2A-2E may be assembled in a repeating pattern as illustrated schematically in FIG. 2B, the separate burner panels 2 being joined at seams 90. Embodiment 1200 illustrates schematically an embodiment having semi-circular slot fuel and oxidant conduit cross-sections; embodiment 1300 illustrates schematically an embodiment having semi-circular fuel and oxidant conduit cross-sections; embodiment 1400 illustrates schematically an embodiment having rectangular fuel and oxidant conduit cross-sections, where each fuel conduit 4 is larger than its corresponding oxidant conduit 6, and all fuel conduits 4 are in a line, and all oxidant conduits 6 are in a line parallel to the fuel conduits.

Figure 3:
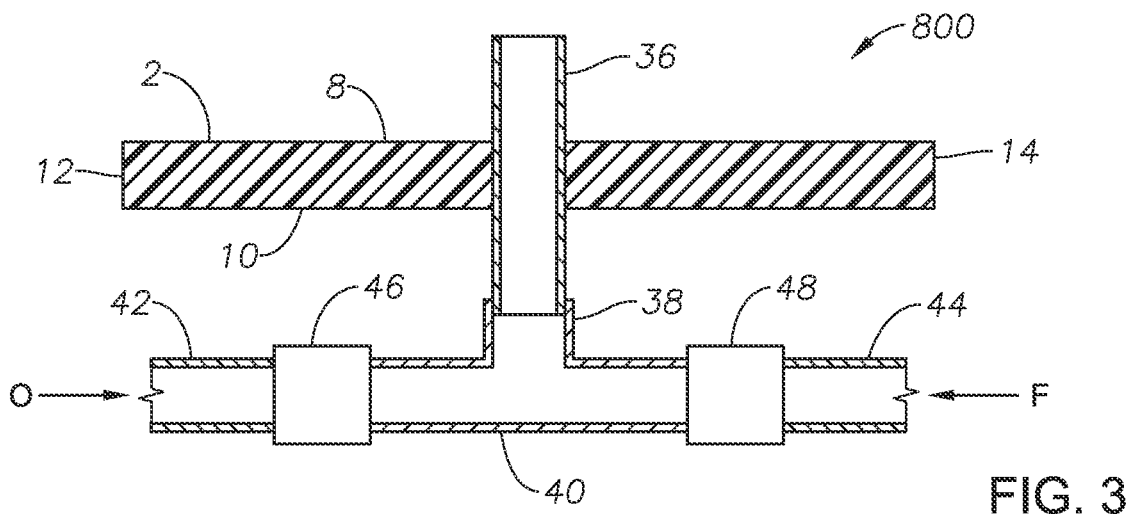
FIG. 3 is a schematic cross-sectional view of another burner panel in accordance with the present disclosure.

FIG. 3 illustrates schematically, embodiment 800, wherein fuel and oxidant are injected at the same point but may be injected at different times through a single conduit 36 connected fluidly at 38 to a "T" connection 40, and to an oxidant supply conduit 42 and associated valve or flow oscillator 46, and to a fuel supply conduit 44 and associated valve or flow oscillator 48. For example, a burner flowing only oxygen for 1 second and then only fuel for 1 second; thus, the oxygen and fuel would mix above the burner tip keeping most combustion away from the burner tip.

Other options are to use one or more slot nozzles for the introduction of the oxidant or fuel with small radial nozzles inside the oxidant or fuel slot for the introduction of the fuel or oxidant. This would change the glass and burner flows relationship relative to thermal stress and these designs are also easily scaled in size by increasing the length of the slot. Another version of this is replacing the radial nozzles with a small slot inside a larger slot. Again changing the process dynamics and failure issues with the current shaped burners and allowing the burners to be scaled. These slot designs could also be beneficial to the glass quality and melting process by creating an improved burner for the glass to pass through as it moves through the melter toward the SCM exit.

Figure 4A:
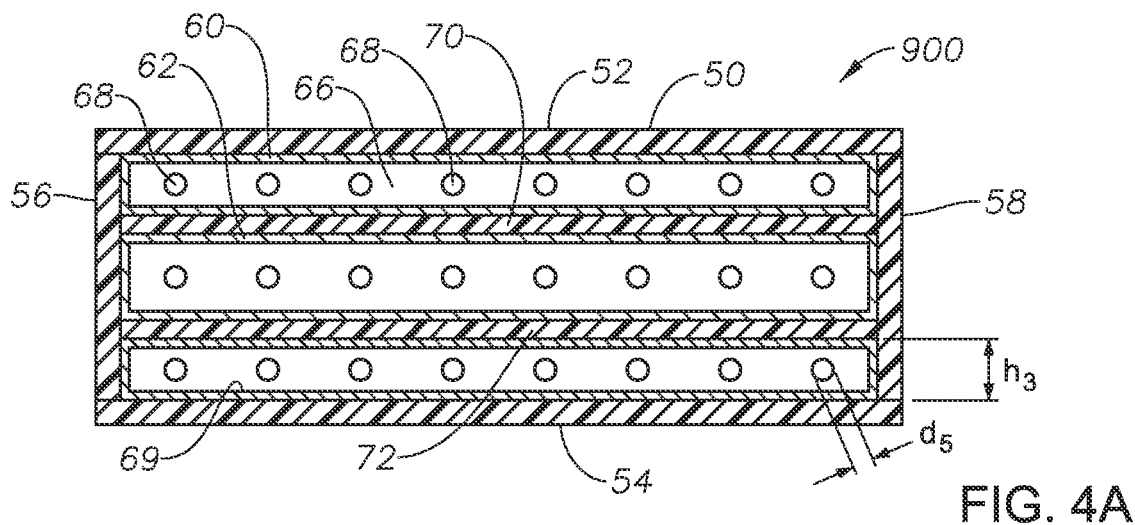
Figure 4B:
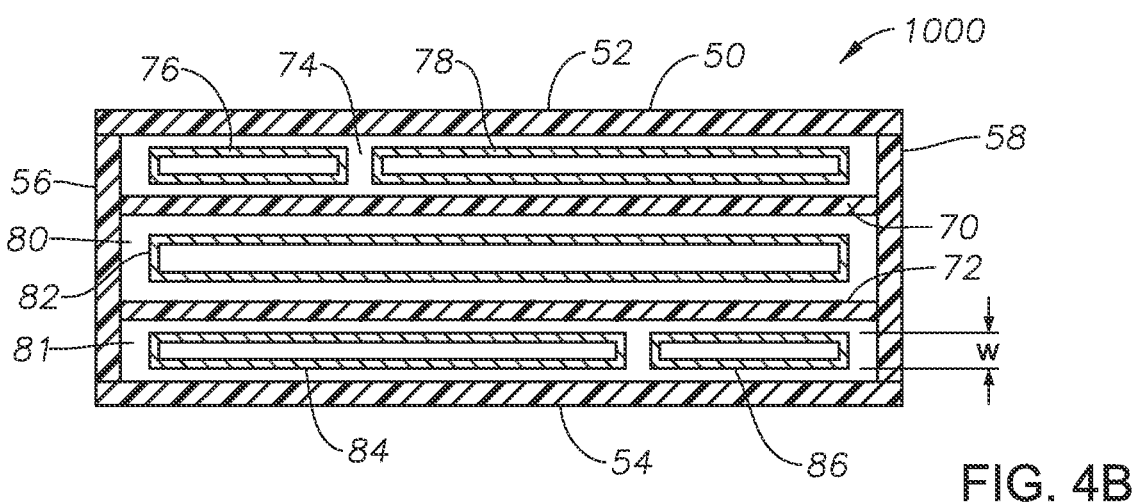

FIGS. 4A and 4B illustrate schematic plan views of burner panel embodiments 900 and 1000, where slot nozzles may be employed for fuel or oxidant, with the other of the two materials injected through a plurality of smaller nozzles, in embodiment 900 small round nozzles. Burner panel embodiment 900 includes a frame 50 including first and second main frame pieces 52, 54 and third and fourth end frame pieces 56, 58 enclosing three slot nozzles 60, 62, 64, each of height $h_3$ and each defining an internal space 66 for flow of fuel or oxidant. A wall 70 may separate slot nozzles 60 and 62, and a wall 72 may separate slot nozzles 62 and 64. In other embodiments, walls 70, 72 may not be necessary. Small circular nozzles 68 of diameter $d_5$ are positioned within the slot nozzles 60, 62, 66 as illustrated, it being understood that more or less small nozzles 68 may be positioned in the respective slot nozzles, and the number of small nozzles 68 may not be the same in each slot nozzle. Height $h_3$ may range from about the range of at least 5 cm or greater; for example, the height $h_3$ may have a magnitude in the range of at least 10 cm or greater; or in the alternative, the height $h_3$ may have a magnitude in the range of at least 12 cm or greater; or in the alternative, the height $h_3$ may have a magnitude in the range of at least 15 cm or greater; or in the alternative, the height $h_3$ may have a magnitude in the range of at least 20 cm or greater. The magnitude of height $h_3$ is limited only by the width of the body panel W and the number of slot nozzles. The upper limit of the magnitude of $d_5$ is limited by the value of $h_3$, but may generally range from about 2 to about 10 cm.

In embodiment 1000, a plurality of slot nozzles 76, 78, 82, 84, and 86 may be employed for fuel or oxidant, with the other of the two combustion materials injected through surrounding internal spaces 74, 80, and 81 defined by frame pieces 52, 54, 56, and 58, as well as walls 70, 72. The magnitude of width "w" of slot nozzles 76, 78, 82, 84, and 86 is limited by the distance between frame pieces and walls, but may generally range from about 2 to about 10 cm.

Another option to approach separation of the fuel and oxidant is to generate separate permeable, or diffused zones in the melter that emit fuel and oxidant separately. This concept can include arrays of small holes, permeable membranes, porous materials and so forth. These systems may take on many forms. In one such embodiment, discrete zones or panels where each supplies only oxidant or fuel. Another embodiment may be a single panel with primarily oxidant on one side and primarily fuel on the other side with a gradual transition from one end to the other and fuel to oxidant with the center portion of the panel having a mixture of both. This embodiment may also include discrete and variably shaped zones within a given panel where oxidant and fuel may be added separately involving patterns such as checkerboards, waves, and countless others.

FIGS. 5A-5D illustrate schematically, in plan view, four other SCM burner panel embodiments in accordance with the present disclosure, each including independent zones of permeable material or arrays of small diameter holes that enable fuel and oxidant to enter the SCM. These embodiments are only examples of a plethora of patterns enabling the interaction of the fuel and oxidant. In each embodiment, the burner panel may either be independent panels within a melter floor or serve as the floor itself. Embodiment 1420 illustrated schematically in plan view in FIG. 5A, includes a frame 50 enclosing a porous material allowing three overlapping zones 1422 for fuel or oxidant, zone 1424 where fuel and oxidant are both injected, and zone 1426 where predominantly oxidant or fuel may be injected from the bottom and/or side of an SCM for submerged combustion.

Figure 5A:
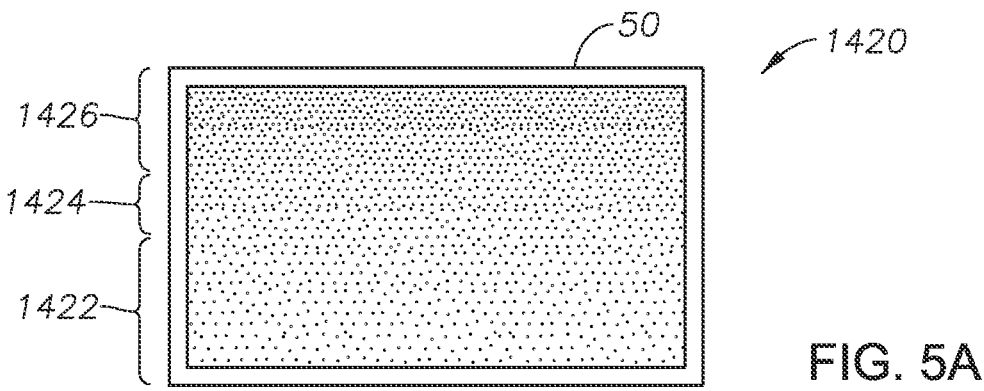
Figure 5B:
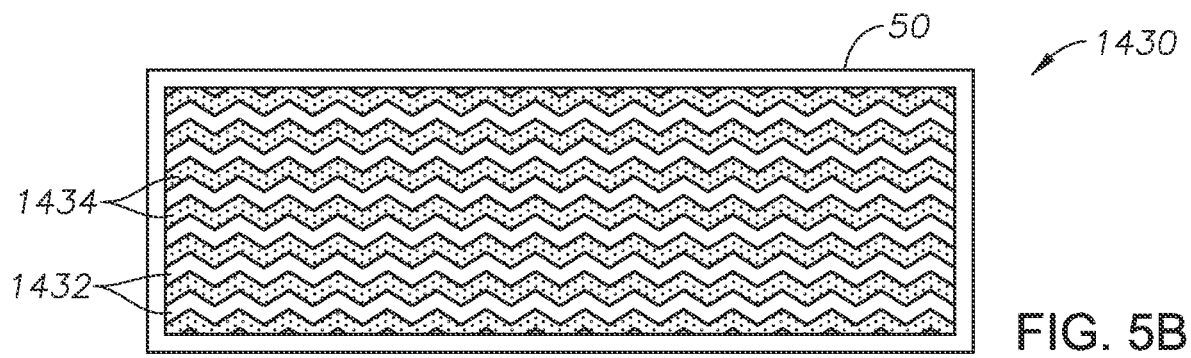

Embodiment 1430 illustrated schematically in plan view in FIG. 5B, includes a frame 50 enclosing alternating chevron patterned regions 1432 and 1434 for fuel and/or oxidant injection, the patterned regions formed by the same or different porous material in each region. One set of chevron patterned region 1432 or 1434 would allow passage of oxidant, while the other set would allow for passage of fuel.

Figure 5C:
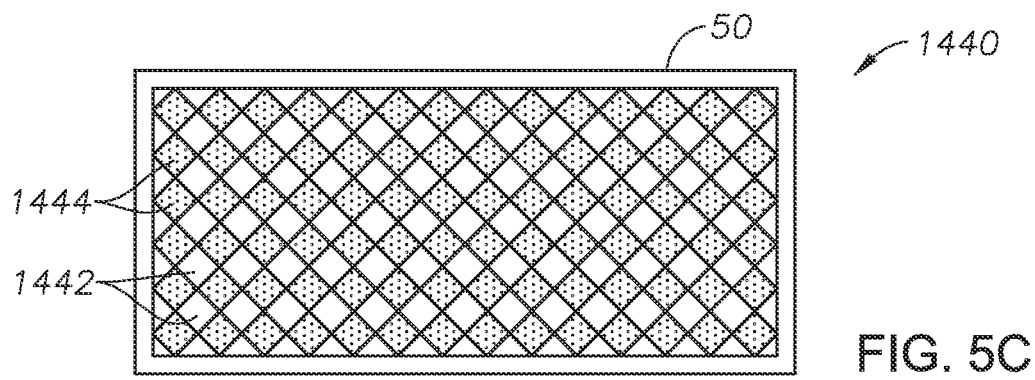

Embodiment 1440 illustrated schematically, in plan view in FIG. 5C, includes a frame 50 enclosing alternating square or diamond patterned regions 1442 and 1444 for fuel and/or oxidant injection, the patterned regions formed by the same or different porous material in each region. One set of square or diamond patterned regions 1442 or 1444 would allow passage of oxidant, while the other set would allow for passage of fuel.

Figure 5D:
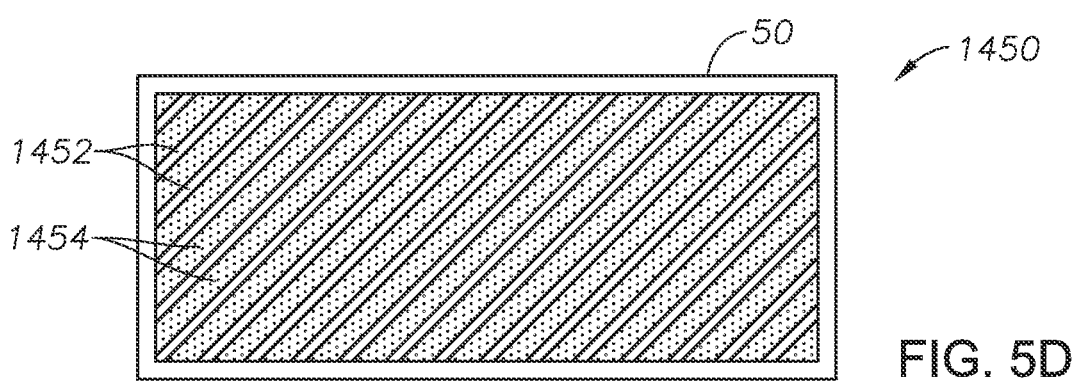

Embodiment 1450 illustrated schematically, in plan view in FIG. 5D, includes a frame 50 enclosing alternating line patterned regions 1452 and 1454 for fuel and/or oxidant injection, the patterned regions formed by the same or different porous material in each region. One set of line patterned region 1452 or 1454 would allow passage of oxidant, while the other set would allow for passage of fuel.

Figure 6:
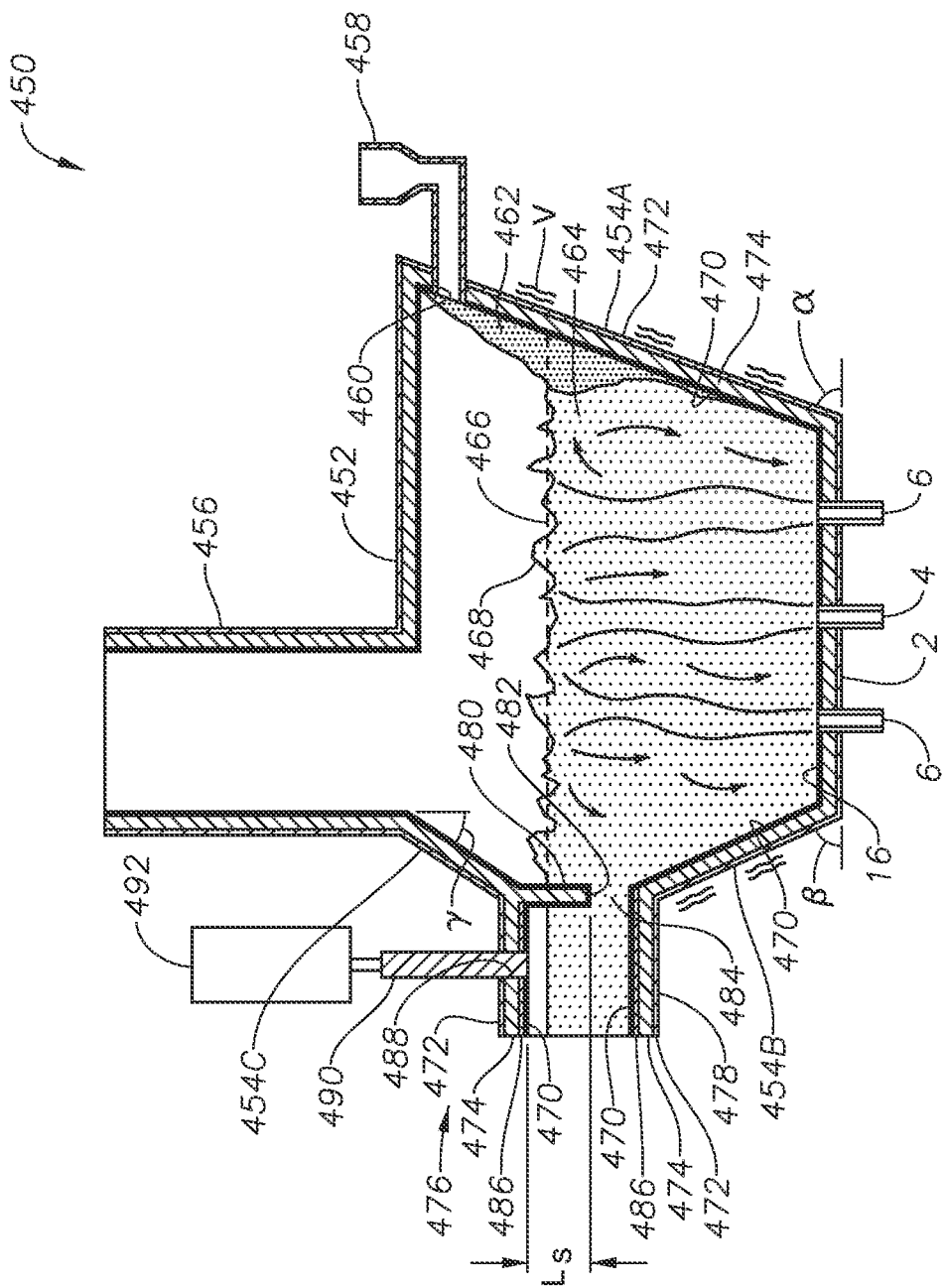
FIG. 6 is a schematic cross-sectional view of an SCM in accordance with the present disclosure.

Referring now to FIG. 6, embodiment 450 of an SCM in accordance with the present disclosure is illustrated in vertical sectional view. SCM embodiment 450 comprises a melter having a floor 2 (which may be a burner panel in accordance with the present disclosure), a roof or ceiling 452, a feed end wall 454A, a first portion of an exit end wall 454B, and a second portion of the exit end wall 454C. Feed end wall 454A and exit end wall portion 454B may form angles "α" and "β", respectively, with respect to floor 2, as indicated. Angles α and β may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. Exit end wall portion 454C may form an angle "γ" with respect to skimmer 480. Angle γ may be the range from 0 to about 70 degrees, or from about 30 degrees to about 75 degrees. Increasing this angle beyond these ranges may require more floor space for the melters, and/or more material of construction, both of which are generally undesirable. Decreasing this angle may promote escape of unmelted or melted material up stack 456, or deposition onto internal surfaces of stack 456, both of which are also undesirable. A frozen and/or highly viscous glass layer or layers 470 may be formed on the inside surfaces of walls 454A, 454B, due to the use of fluid-cooled panels for these walls.

One or more or all of walls 454A, 454B, 454C, floor 2, and roof 452 may be comprised of a metal shell 472 and a fluid-cooled refractory panel 474.

System embodiment 450 further includes an exhaust stack 456, and submerged combustion fuel and oxidant conduits 4, 6, in burner panel 2 which create during operation a highly turbulent melt indicated at 468. In certain embodiments, fuel and oxidant conduits 4, 6 are positioned to emit fuel and oxidant into molten glass in the melting zone 464 in a fashion so that the gases combust and penetrate the melt generally perpendicularly to floor panel 2. In other embodiments, one or more fuel or oxidant conduits 4, 6 may emit fuel or oxidant into the melt at an angle to floor 2, where the angle may be more or less than 45 degrees, but in certain embodiments may be 30 degrees, or 40 degrees, or 50 degrees, or 60 degrees, or 70 degrees, or 80 degrees.

The initial raw material can be introduced into the melter of system 450 on a batch, semi-continuous or continuous basis. In some embodiments, a port 460 is arranged at end 454A of the melter through which the initial raw material is introduced by a feeder 458. In some embodiments a "batch blanket" 462 may form along wall 454A, as illustrated. Feed port 460 may be positioned above the average glass melt level, indicated by dashed line 466. The amount of the initial raw material introduced into the melter is generally a function of, for example, the capacity and operating conditions of the melter as well as the rate at which the molten material is removed from the melter.

The initial raw material feedstock may include any material suitable for forming molten inorganic materials, such as glass, such as, for example, limestone, glass, sand, soda ash, feldspar and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. application 20080276652. The initial raw material can be provided in any form such as, for example, relatively small particles, or in the case of rock wool or mineral wool manufacture, in large pieces 5 cm or more in diameter.

As noted herein, submerged combustion burners and burner panels may produce violent turbulence of the molten inorganic material in the SCM and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in assignee's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of feeder 458 may be adjusted through a signal, and one or more of fuel and/or oxidant conduits 4,6 may be adjusted via a signal, it being understood that suitable transmitters and actuators, such as valves and the like, are not illustrated for clarity.

Referring again to FIG. 6, system embodiment 450 includes a melter exit structure 476 for discharging the molten glass or similar material. Melter exit structure 476 is positioned generally downstream of melter exit ends 454B, 454C as illustrated of FIG. 6, and may fluidly and mechanically connect the melter vessel to a molten glass conditioning channel (not illustrated). Melter exit structure 476 comprises a fluid-cooled transition channel 478, having generally rectangular cross-section in embodiment 450, although any other cross-section would suffice, such as hexagonal, trapezoidal, oval, circular, and the like. Regardless of cross-sectional shape, fluid-cooled transition channel 478 is configured to form a frozen glass layer or highly viscous glass layer, or combination thereof, on inner surfaces of fluid-cooled transition channel 478 and thus protect melter exit structure 476 from the mechanical energy imparted from the melter vessel to melter exit structure 476. Melter exit structure 476 may in certain embodiments comprise an essentially rectangular, fluid-cooled, ceramic or metallic box having a length, a width, a height. In these embodiments, length may range from about 5 to about 50 percent, or from about 10 to about 40 percent, of the entire length of the melter apparatus. The width of melt exit structure 476 may be the same as the width of the melter apparatus, or may be less or more than the width of the melter apparatus. The height may range from about 5 to about 50 percent, or from about 10 to about 40 percent, of the entire height of the melter apparatus, measured from floor 2 to ceiling 4. Melter length, width and height depend primarily on the amount of raw material to be fed, the amount of molten glass to be produced, and the desired throughputs mentioned herein.

A fluid-cooled skimmer 480 may be provided, extending downward from the ceiling of the melter vessel and positioned upstream of fluid-cooled transition channel 478. Fluid-cooled skimmer 480 has a lower distal end 482 extending a distance $L_s$ ranging from about 1 inch to about 12 inches (from about 2.5 cm to about 30 cm) below the average melt level 466. Fluid-cooled skimmer 480 may be configured to form a frozen glass layer or highly viscous glass layer, or combination thereof, on its outer surfaces. Skimmer lower distal end 482 defines, in conjunction with a lower wall of melter exit structure 476, a throat 484 of the melter vessel, throat 484 configured to control flow of molten glass from the melter vessel into melter exit structure 476. Preferably, the throat 484 is arranged below average melt level 466. Molten material can be removed from melter exit structure 476 on a batch, semi-continuous basis or continuous basis. In an exemplary embodiment, the molten material continuously flows through throat 484 and generally horizontally through melter exit structure 476, and is removed continuously from melter exit structure 476 to a conditioning channel (not illustrated). Thereafter, the molten material can be processed by any suitable known technique, for example, a process for forming glass fibers.

Certain embodiments may include an overlapping refractory material layer 486 on at least the inner surface of fluid-cooled transition channel 478 that are exposed to molten material. In certain embodiments the overlapping refractory material may comprise a seamless insert of dense chrome, molybdenum, or other dense ceramic or metallic material. The dense chrome or other refractory material may be inserted into the melter exit structure and may provide a seamless transition form the melter vessel to a conditioning channel (not illustrated).

Another optional feature of system embodiment 450 is the provision of a fluid-cooled dam opening 488 in the upper wall or ceiling of melt exit structure 476. Dam opening 488 accommodates a movable, fluid-cooled dam 490, which is illustrated schematically in FIG. 6 in a retracted position. Dam 490 may be manipulated by a prime mover 492, such as one or more motors, jack screws, or the like. Fluid-cooled dam 490 comprises dimensions allowing the dam to be extended an entire distance from top to bottom of fluid-cooled transition channel 478 and completely isolate the melting zone of the melter vessel from the conditioning channel.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zones, and serve as ignition sources for one or more submerged combustion burners and/or burner panels. Melter apparatus having only wall-mounted, submerged-combustion burners or burner panels are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners and burner panels are oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical heating in certain embodiments, in certain melter zones.

Suitable materials for glass-contact refractory, which may be present in SC melters and downstream flow channels, and refractory panel bodies of burner panels, include fused zirconia ($ZrO_2$), fused cast AZS (alumina-zirconia-silica), rebonded AZS, or fused cast alumina ($Al_2O_3$). The melter geometry and operating temperature, burner body panel geometry, and type of glass or other product to be produced, may dictate the choice of a particular material, among other parameters.

The term "fluid-cooled" means use of a coolant fluid (heat transfer fluid) to transfer heat away from the burner panel or other component (such as structural walls of an SCM), either by the fluid traveling through the refractory of the panel, through conduits positioned in or adjacent the refractory of the panel, and the like, and does not include natural heat transfer that may occur by ambient air flowing past the panel, or ambient air merely existing adjacent a panel. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more fuel and/or oxidant conduits in the SCM and/or flow channel(s) downstream thereof may be adjustable with respect to direction of flow of the fuel or oxidant or both. Adjustment may be via automatic, semi-automatic, or manual control. Certain system embodiments may comprise a mount that mounts the fuel or oxidant conduit in a burner panel of the SCM and/or flow channel comprising a refractory, or refractory-lined ball joint. Other mounts may comprise rails mounted in slots in the wall or roof. In yet other embodiments the fuel and/or oxidant conduits may be mounted outside of the melter or channel, on supports that allow adjustment of the fuel or oxidant flow direction. Useable supports include those comprising ball joints, cradles, rails, and the like.

Certain SCMs and method embodiments of this disclosure may include fluid-cooled panels such as disclosed in assignee's U.S. Pat. No. 8,769,992. Certain systems and processes of the present disclosure may utilize measurement and control schemes such as described in assignee's U.S. Pat. No. 9,086,453, and/or feed batch densification systems and methods as described in assignee's U.S. Pat. No. 9,643,869 Certain SCMs and processes of the present disclosure may utilize devices for delivery of treating compositions such as disclosed in assignee's U.S. Pat. No. 8,973,405.

Certain SCMs and process embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner panel, temperature of the primary oxidant as it enters the burner panel, temperature of the effluent, pressure of the primary oxidant entering the burner panel, humidity of the oxidant, burner panel geometry, combustion ratio, and combinations thereof. Certain SCMs and processes of this disclosure may also measure and/or monitor feed rate of batch or other feedstock materials, such as glass batch, cullet, mat or wound roving and treatment compositions, mass of feed, and use these measurements for control purposes.

Figure 8:
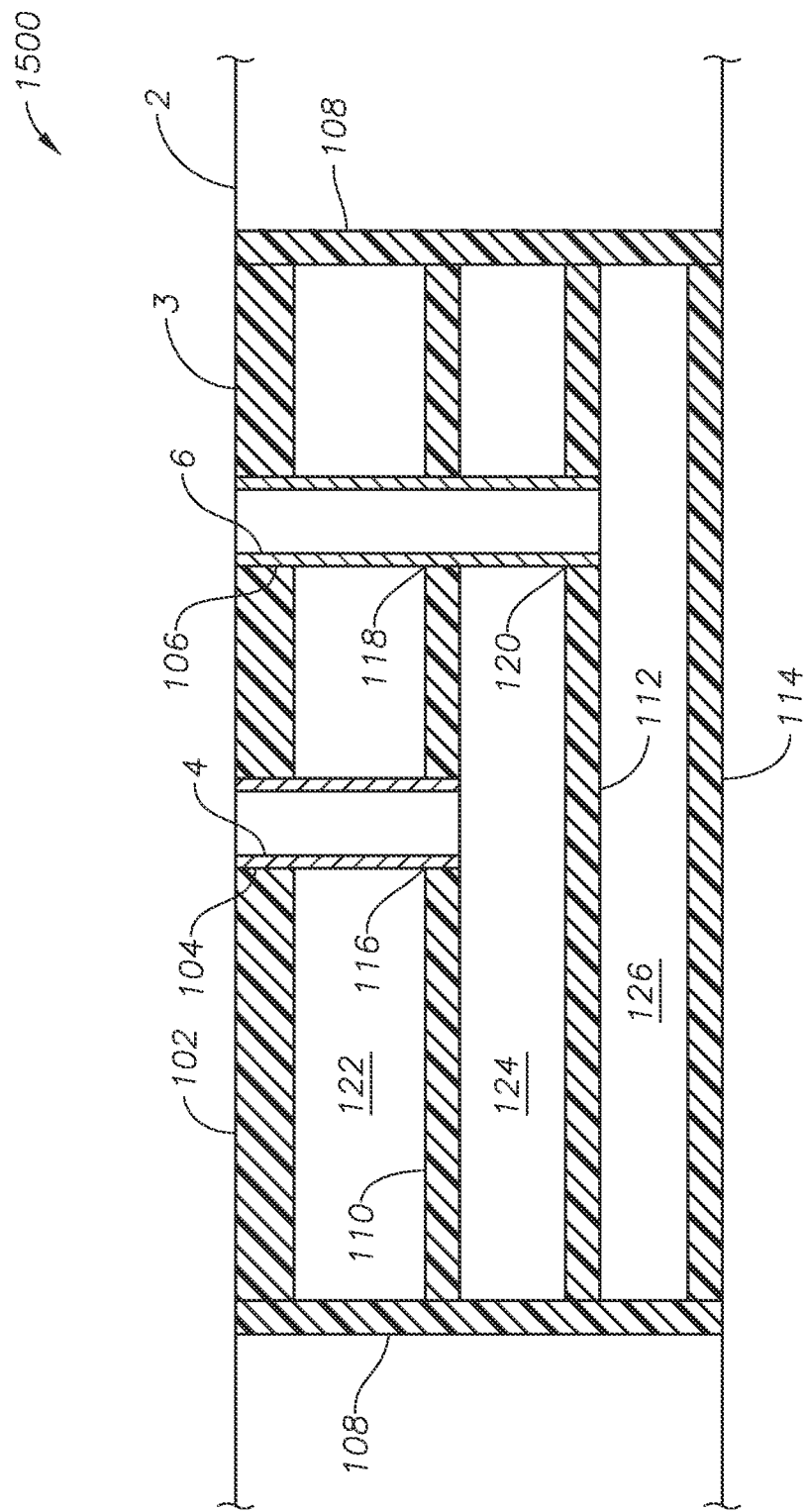
FIG. 8 is a schematic cross-sectional view of a burner panel in accordance with the present disclosure.

At high level, the burner panels of the present disclosure include a burner body 3 and three internal chambers inside of the burner panel or melter floor panel, each chamber immediately below the next in elevation, with multiple ports from each of the fuel and oxidant chambers being fitted to eject the fuel and oxidant into the melter interior, and the "topmost" chamber being actively fluid-cooled to both ensure safety and long term survivability of the burner. The general configuration of the three chambers is as illustrated schematically in the simplified vertical cross-sectional view of FIG. 8, embodiment 1500, with the oxidant supply, fuel supply, cooling supply, and cooling return conduits not shown, and with only one fuel and one oxidant port (of many) illustrated for simplicity. A top panel 102 includes through passages 104, 106 for fuel and oxidant conduits 4, 6, while a second panel or tube table 110 includes corresponding through passages 116 for fuel and through passage 118 for oxidant, and a third panel 112 includes through passages 120 only for oxidant. A sidewall structure 108 and fourth panel 114 complete this simplified structure. Three internal chambers are thus formed, 122 for coolant fluid, 124 for fuel, and 126 for oxidant. The fuel and oxidant chambers 124, 126 may be alternatively swapped in position to each other from that illustrated in the schematic cross-section of FIG. 8 (i.e., oxidant chamber may be above fuel chamber).

Figure 10:
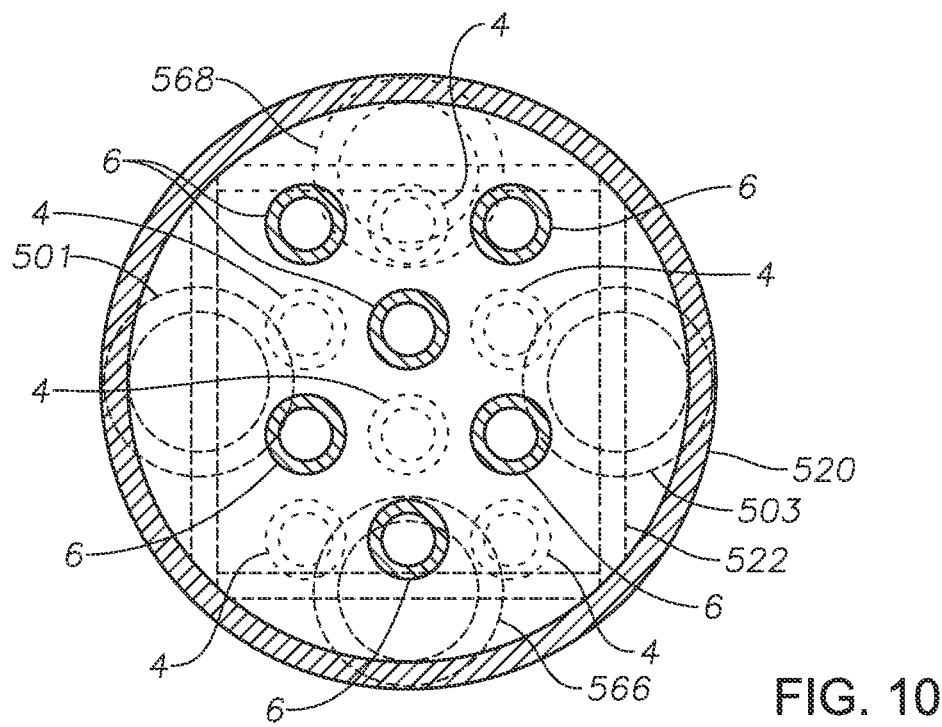
FIGS. 10 and 11 are schematic plan views, partially in cross-section, of burners of the present disclosure.
Figure 11:
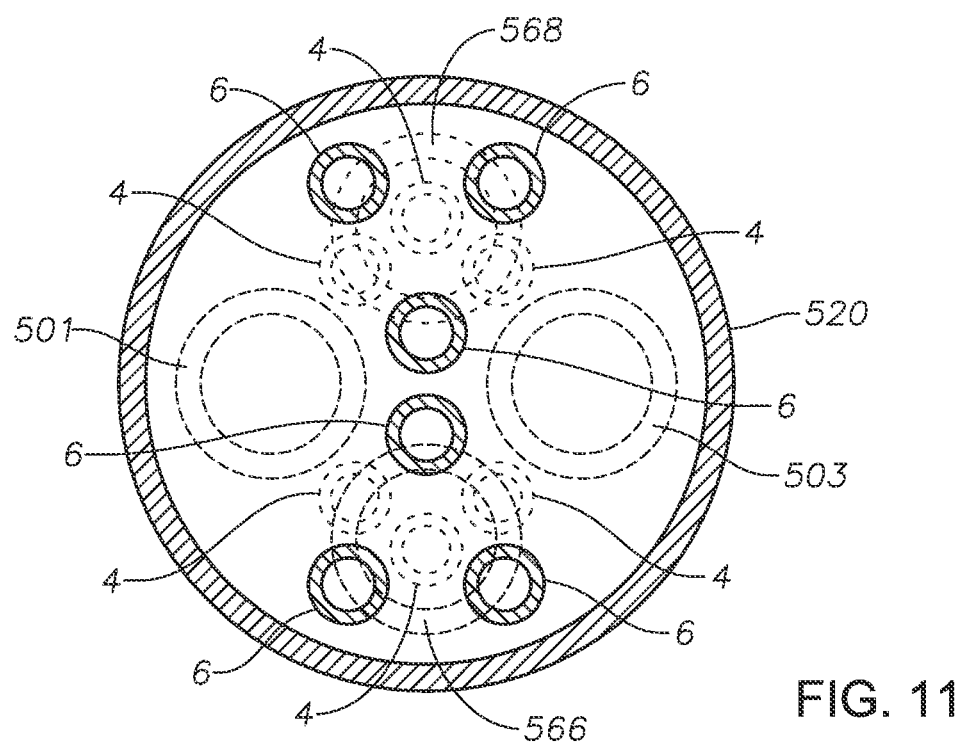

Embodiments to provide oxidant supply, fuel supply, cooling supply, and cooling return into and through the various chambers may vary in geometry such that various arrangements of alternating oxidant and fuel ports may be created Two example configurations are illustrated in schematic plan views, partially in phantom, in FIGS. 10 and 11, with certain cross-sectional simplicities made and liberties taken, for ease of illustration. While FIGS. 10 and 11 illustrate a circular burner (or circular burner area in the melter floor panel) in plan view, the burner may comprise other shapes such as square, rectangular, polygonal, or other, without constraint, so long as the cooling, fuel, and oxidant chambers are formed and various conduits are added to eject the fuel and oxidant. While the schematic illustrations of FIGS. 10 and 11 illustrate two preferred arrangements of alternating oxidant conduits 6 and fuel conduits 4 to maximize comingling of the gases and to maximize energy release, alternatively the conduits may be arranged in any number of patterns, alternating in rows, or in areas, in columns, or in any number of other patterns to effect flame behavior differences and/or glass circulation differences within the affected volume above each burner and between adjacent burners. While FIGS. 10 and 11 illustrate conduits having circular openings, the conduits may be any number of shapes such as slots, circles, squares, rectangles, or other polygonal shapes.

The fluid flow behaviors within each chamber and through the various oxidant and fuel conduits may be altered through a combination of conduit placement, supply placement, chamber height, and placement of any flow diverters, diffusing baffles or screens, or other components within the areas of flow such that all conduits carry purposeful amounts of the total flow, both equal or unequal. Such flow diverters thereby allow the flows out the top surface of the burner to be tailored. For example, diverters may be sized and positioned to ensure all conduits are flowing equally, or may be sized and positioned to give preference to fuel flow more centrally in plan view and oxidant flow more peripherally in plan view, or profiled from lowest to highest flows out the top surface of the burner laterally. Such tailoring, enabled by the design of the burner incorporating chambers, and judiciously positioning such burners within the overall melter floor plan, allows the SCM to have flames that encourage glass flow in specific patterns within the melter, those molten product flow patterns having operational benefit to the glass or other material produced, the melter walls or structure, energy utilization, or other performance attributes.

Figure 9A:
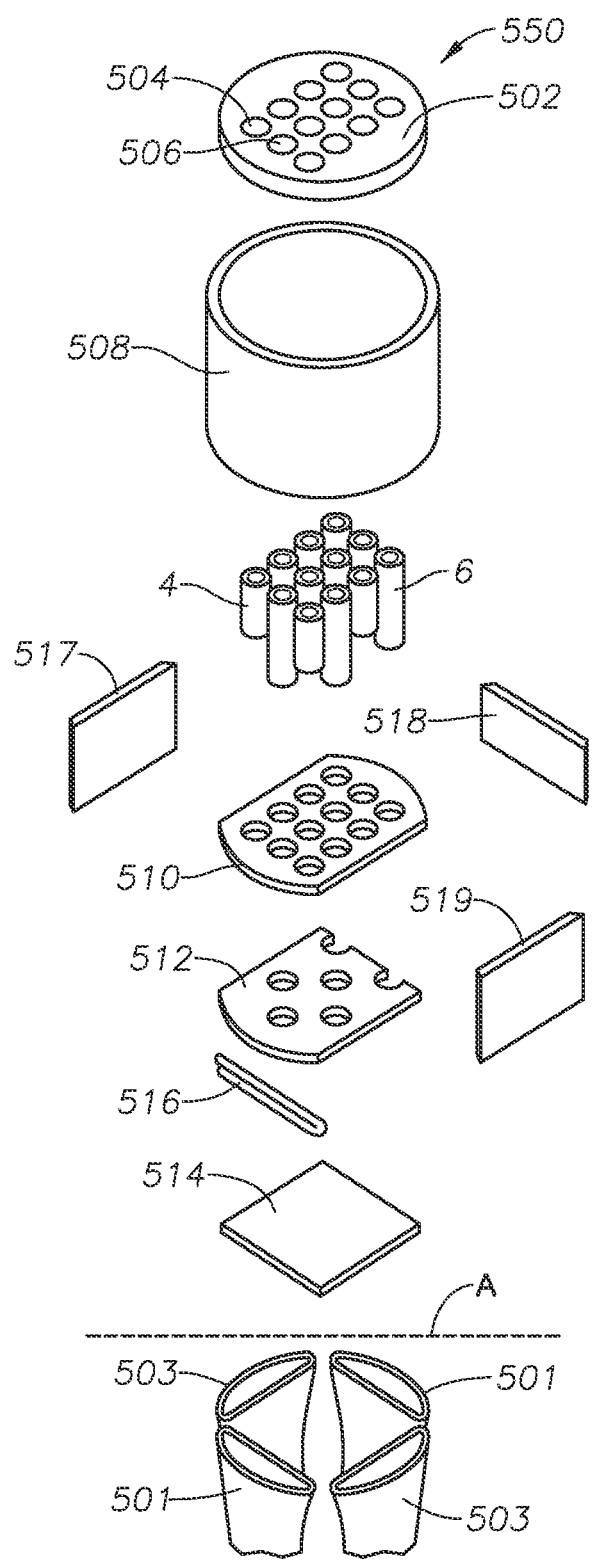
FIGS. 9A and 9B are schematic exploded perspective views, of two burners of the present disclosure.
Figure 9B:
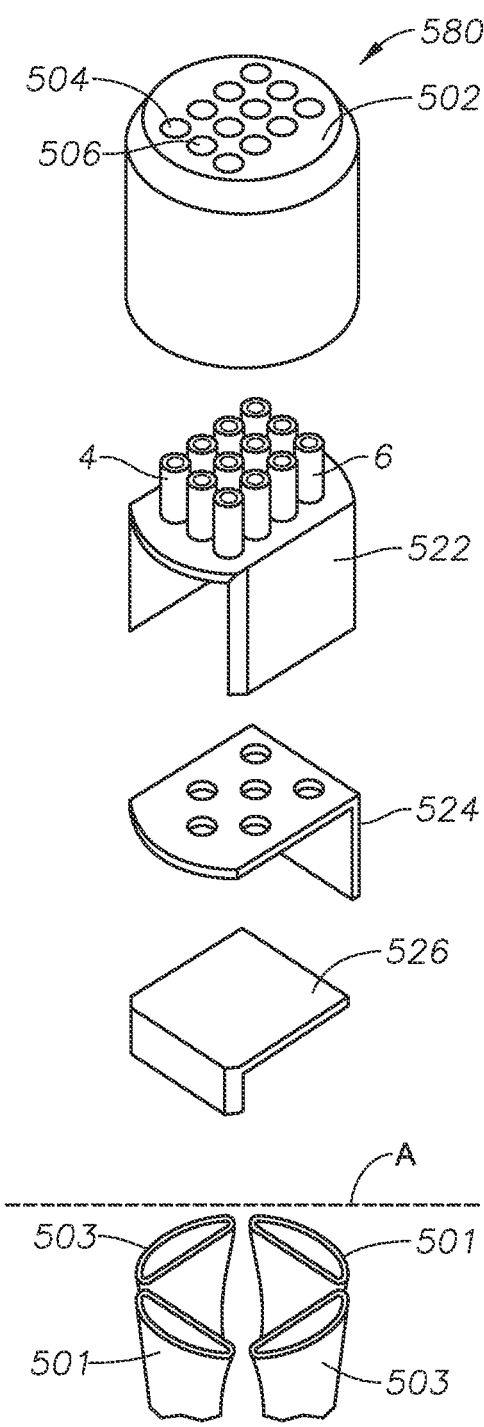

FIGS. 9A and 9B are schematic exploded perspective views, of two burner embodiments 550 and 580 of the present disclosure. The burner designs were conceived to produce subassemblies of the burner as a single specially-formed component, rather than as a subassembly made from a high quantity of common shapes which have to be welded together. The result is a more homogeneous metallic microstructure, with less welding, brazing, or fusing, and therefore with fewer opportunities for leakage between adjacent chambers inside the burner from fabrication welding issues and fewer opportunities for the part to fail while in service.

In the illustrations of FIGS. 9A and 9B, both burners 550 and 580 have the exact same function once assembled. The burner of embodiment 550 is designed and fabricated using a high quantity of parts, each having to be welded or fused together. These parts include six fuel conduits 4; six oxidant conduits 6; two coolant supply conduits 501; two coolant return conduits 503; a burner top or cap 502 having through holes or ports 504, 506 for the six fuel and the six oxidant fuel conduits; a burner wall structure 508; plates 510, 512, and 514; ceramic side panels 517, 518, and 519, and a ceramic fitting 516. However, burner embodiment 580 is fabricated from a small number of specially formed parts: parts 520 (a combination of parts 502 and 508); a tube table part 522 (a combination of parts 4, 6, 510, 514, 516, 517, and 519); part 524 (a combination of parts 512, 516, and 518); and part 526 (a combination of part 514 and a downward vertical piece). Burner embodiment 550 of FIG. 9A has 21 parts above the dashed line "A"; burner embodiment 580 of FIG. 9B has 4 parts and requires approximately 17 fewer welds. Likewise, the 4 parts of burner embodiment 580 are more complex to form.

To enable this improved fabrication, the 4 complex parts illustrated in burner embodiment 580 may be formed by one or more methods selected from CNC machining each shape from a billet, EDM cutting each shape from a billet, direct laser metal sintering (such as rapid prototyping, metal 3D printing, SLA printing), near-net or net-shape casting, and other technologies which produce such specially formed shapes from uniform materials.

Further, a heat treatment process may be applied to improve the microstructural attributes and stored stresses of the specially formed shapes, and/or of the completed assembly. The heat treatments are material specific, and include classical time-temperature heat treatments, or time-pressure-temperature treatments (for example, hot isostatic pressing). The treatments enable the desired microstructure in the material within the specially formed shapes, the seams and seam heat-affected zones, and in the full assembly. While there is a specific design illustrated in FIG. 9B and in the above discussion, the design and fabrication approach is not constrained to that shown. The method described is applicable to other internal geometries and configurations for burner components where there are large, frequent temperature changes imposed on the assembly while it is in service. The pint of this disclosure is to disclose a range of fabricating technologies and internal design features which may enable producing burner assemblies and burner panels having the fewest number of parts, the fewest number of seams possible, thereby ensuring more robust components in service and reduced potential for failure of the assemblies.

A method of fabricating such a burner and burner panel is an aspect of the present disclosure. One method embodiment 750 is illustrated in the logic diagram of FIG. 7. In this embodiment of the method, the method comprises (a) forming components, in no particular order (box 752):
  (i) the planar cap and external wall as a single component;
  (ii) a tube table comprising the fluid conduits, the oxidant conduits, and a first horizontal wall, with two vertical walls positioned about the horizontal wall, wherein the fuel and oxidant conduits are of different lengths;
  (iii) a second horizontal wall having through-passages for oxidant and fuel conduits, and a third vertical wall; and
  (iv) a third horizontal wall having a single vertical wall pendant therefrom;
  (b) fitting components (i)-(iv) together to form a burner sub-assembly (box 754);
  (c) fitting coolant supply and return conduits to the burner sub-assembly (box 756);
  (d) fitting fuel and oxidant supply conduits to the burner sub-assembly (box 758);
  steps (a)-(d) forming the burner body; and
  (e) fitting or attaching the burner body to the panel body (box 760).

Referring again to FIGS. 10 and 11, a "primary" oxidant supply conduit 566 routes oxidant to oxidant conduits 6, and a "primary" fuel supply conduit 568 routes fuel to fuel conduits 4.

Figure 12:
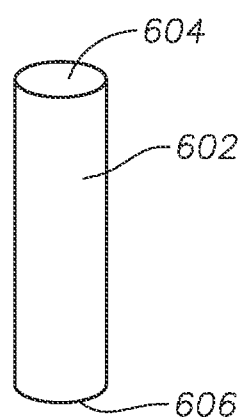
FIG. 12 is a schematic perspective view of a prior art metal ingot.

FIG. 12 is a schematic perspective view of a prior art metal ingot, and FIGS. 13, 14, 15A, and 15B are schematic side elevation, bottom plan, and plan views of portions of a burner made from a metal ingot such as illustrated schematically in FIG. 12. As discussed herein, submerged combustion burners endure a harsh environment, must be actively cooled, and also must be configured to supply both oxidant and fuel through the burner. The internal features of the burner can be quite complex and portions of the burner often have to be precision machined and made from materials that are weldable, therefore material selection is limited and complexity of the burner is high. One solution to this dilemma simplifies the burner configuration by making the burner from a single "slug", "ingot", or other form of material that has no seams or joints. The material simply needs to be drillable and "water" tight, and enables using materials that would otherwise not be practical with burners fabricated from multiple components. Examples of such materials are molybdenum, carbon, and certain ceramics.

Figure 13:
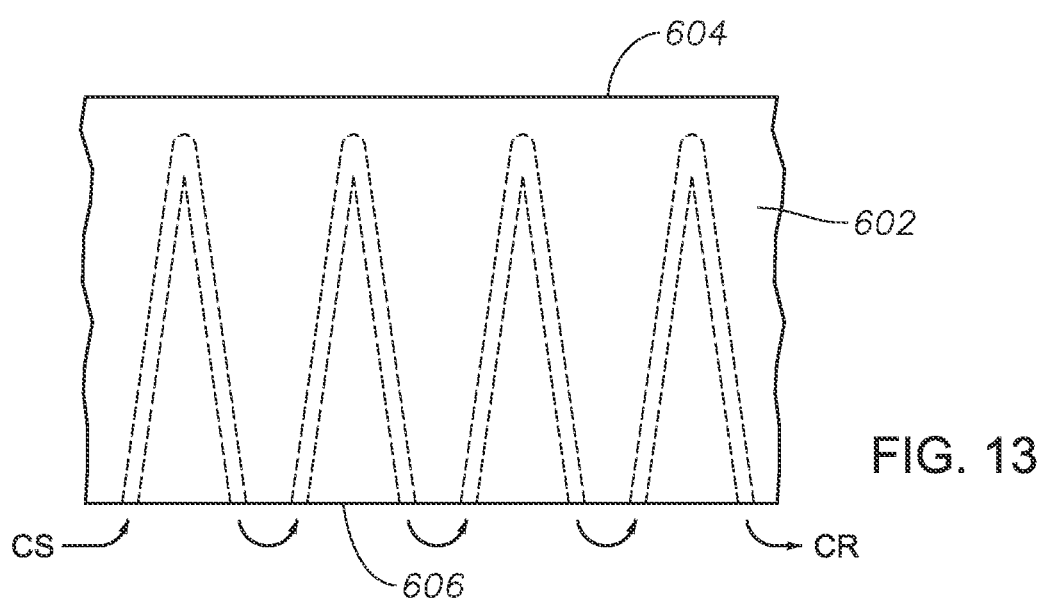
Figure 15A:
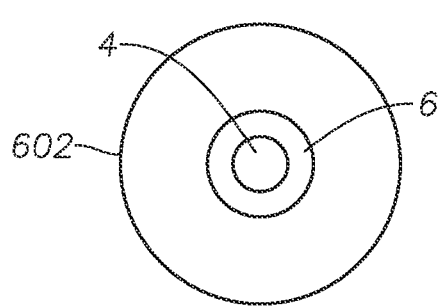
Figure 15B:
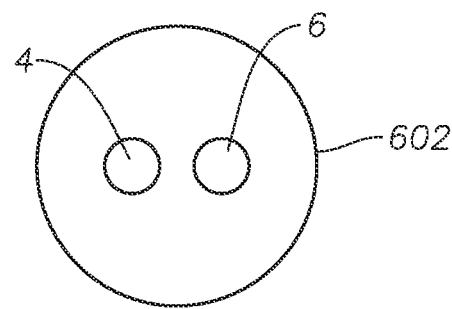

Typically, the improved burner design begins as a circular cylinder of appropriate diameter and length, as illustrated schematically in FIG. 12 at 602. Cooling passages 608, typically water-cooling, are drilled in such a manner that subsequent holes intercept each other near the "tip" 604 without penetrating the tip. The holes then are interconnected at the base 606 of the burner, allowing the cooling fluid to be recirculated from the base 606 to near the tip 604 and back to the base 606 in a series of passages. As viewed around the circumference, the passages 608 may be configured as illustrated in FIG. 13.

Figure 14:
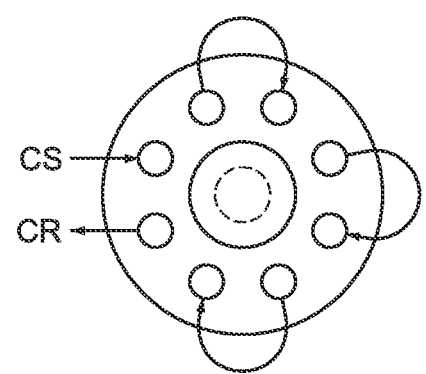
FIGS. 13, 14, 15A, and 15B are schematic side elevation, bottom plan, and plan views of portions of a burner made from a metal ingot such as illustrated schematically in FIG. 12.

At the base 606, the drilled passages 608 are threaded and fittings (not illustrated) may be installed such that the cooling passages 608 are interconnected and have a single coolant supply "CS" and coolant return "CR" as illustrated in FIG. 14. Alternatively to series connections, each cooling passage may be connected to a supply and return, i.e., in parallel. The fuel and oxidant supply passages are through-drilled from base to tip and can be of multiple configurations. A couple possible ways to deliver fuel and oxidant separately through the burner are a larger passage with an inner concentric tube made from a separate component and fitted into place, or side-by-side passages, as illustrated schematically in FIGS. 15A and 15B. In either case, the base of the burner would have appropriate fittings and connections to supply the fuel and oxidant. These examples are not all inclusive, but are generally illustrative of preferred embodiments.

Oxidant and fuel conduits of burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the burners and/or space required for burners.

Oxidant and fuel conduits of burner panels of the present disclosure, or tips thereof, may comprise noble metals and/or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the conduit tip may comprise an 80 wt. percent platinum/20 wt. percent rhodium alloy attached to a base metal conduit using lap joints and brazing, welding or soldering of certain regions of the lap joints, as further explained in assignee's Patent Cooperation Treaty application No. PCT/US13/42182, published as WO2014189504A1.

The choice of a particular material is dictated among other parameters by the chemistry, pressure, and temperature of fuel and oxidant used and type of melt to be produced. The skilled artisan, having knowledge of the particular application, pressures, temperatures, and available materials, will be able design the most cost effective, safe, and operable burner panels for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. Preferably, burner panels will have a satisfactory service life of at least 12 months under conditions existing in a continuously operating SCM. As used herein the SCM may comprise a floor, a roof, and a sidewall structure connecting the floor and roof defining an internal space, at least a portion of the internal space comprising a melting zone, and one or more combustion burner panels of this disclosure in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone.

The total quantities of fuel and oxidant used by burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner panel embodiments of the present disclosure depends on the burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner panel control elements, and/or to local devices associated with burner panel control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A submerged combustion burner panel comprising:
   (a) a submerged combustion burner panel body having first and second major surfaces and at least one shaped edge, the shape of the at least one shaped edge configured such that the submerged combustion burner panel mates with one or more adjacent submerged combustion burner panels or non-burner wall elements of a submerged combustion melter;
   (b) at least one oxidant through-passage in the submerged combustion burner panel body extending from the first to the second major surface;
   (c) at least one fuel through-passage in the submerged combustion burner panel body extending from the first to the second major surface, each of the at least one fuel passage non-co-axial with any of the at least one oxidant through-passage;
   (d) at least one oxidant delivery conduit positioned in the at least one oxidant through-passage;

(e) at least one fuel delivery conduit positioned in the at least one fuel through-passage;

wherein each of the oxidant delivery conduits and fuel delivery conduits comprise proximal and distal ends, the distal ends positioned away from the first major surface of the submerged combustion burner panel body.

2. The submerged combustion burner panel of claim 1 wherein the at least one oxidant through-passage comprises a plurality of oxidant through-passages, the at least one oxidant delivery conduit comprises a plurality of oxidant delivery conduits, the at least one fuel through-passage comprises a plurality of fuel through-passages, the at least one fuel delivery conduit comprises a plurality of fuel delivery conduits, and wherein the pluralities of oxidant through-passages and oxidant delivery conduits is more than, equal to, or less than the pluralities of fuel through-passages and fuel delivery conduits.

3. The submerged combustion burner panel of claim 2 wherein the plurality of oxidant delivery conduits is within about 25 percent of the plurality of fuel delivery conduits.

4. The submerged combustion burner panel of claim 2 wherein the plurality of oxidant delivery conduits is within about 10 percent of the plurality of fuel delivery conduits.

5. The submerged combustion burner panel of claim 1 wherein one or more of the at least one fuel delivery conduit and oxidant delivery conduits are formed from a single ingot of metal having formed therein one or more fuel or oxidant passages, and having formed therein one or more passages for coolant fluid.

6. The submerged combustion burner panel of claim 1 wherein each oxidant delivery conduit is perpendicular to the submerged combustion panel body.

7. The submerged combustion burner panel of claim 1 wherein at least one oxidant delivery conduit is positioned at an angle to said submerged combustion panel body.

8. The submerged combustion burner panel of claim 1 wherein each fuel delivery conduit is perpendicular to the submerged combustion panel body.

9. The submerged combustion burner panel of claim 1 wherein one or more of the oxidant delivery conduits are positioned within about five fuel delivery conduit diameters from each fuel delivery conduit.

10. The submerged combustion burner panel of claim 1 wherein the at least one oxidant delivery conduit and the at least one fuel delivery conduit are configured such that during operation oxidant flowing from one of the at least one oxidant delivery conduit combusts fuel flowing from two of the at least one fuel delivery conduits.

11. The submerged combustion burner panel of claim 1 wherein the at least one oxidant delivery conduit and the at least one fuel delivery conduit have cross-sectional shapes selected from the group consisting of rectangular, round, oval, annular, semi-annular (including half-annular), semi-circular (including half-circular), and triangular.

12. A submerged combustion melter comprising at least one submerged combustion burner panel of claim 1.

13. A method of melting non-metallic inorganic feedstock using a submerged combustion melter, the method comprising:

(a) feeding the feedstock into the submerged combustion melter of claim 12; and (b) melting the feedstock.

* * * * *